US012701534B2

(12) United States Patent
Liu

(10) Patent No.: US 12,701,534 B2
(45) Date of Patent: Aug. 4, 2026

(54) METHOD, APPARATUS AND DEVICE FOR LOCATION ACQUISITION, MEDIUM, CHIP, PRODUCT, AND PROGRAM

(71) Applicant: GUANGDONG OPPO MOBILE TELECOMMUNICATIONS CORP., LTD., Dongguan (CN)

(72) Inventor: Yang Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 292 days.

(21) Appl. No.: 18/417,884

(22) Filed: Jan. 19, 2024

(65) Prior Publication Data

US 2024/0155543 A1 May 9, 2024

Related U.S. Application Data

(63) Continuation of application No. PCT/CN2021/108726, filed on Jul. 27, 2021.

(51) Int. Cl.
*H04W 64/00* (2009.01)
*H04W 24/10* (2009.01)
*H04W 72/25* (2023.01)

(52) U.S. Cl.
CPC ........... *H04W 64/00* (2013.01); *H04W 24/10* (2013.01); *H04W 72/25* (2023.01)

(58) Field of Classification Search
CPC .................................................... H04W 64/00
USPC .................................................... 455/456.1
See application file for complete search history.

(56) References Cited

U.S. PATENT DOCUMENTS

| | | | | |
|---|---|---|---|---|
| 11,711,782 B2 * | 7/2023 | Bao | ........................ | H04B 17/24 |
| | | | | 455/456.1 |
| 11,838,230 B2 * | 12/2023 | Damnjanovic | ....... | H04L 5/0048 |
| 2020/0163028 A1 * | 5/2020 | Chae | ..................... | H04W 52/38 |
| 2021/0219103 A1 * | 7/2021 | Wang | .................... | G01S 5/0236 |
| 2022/0279313 A1 | 9/2022 | Huang | | |
| 2022/0394744 A1 * | 12/2022 | Lee | ........................ | H04W 72/20 |

FOREIGN PATENT DOCUMENTS

| | | |
|---|---|---|
| CN | 111989585 A | 11/2020 |
| CN | 112584487 A | 3/2021 |
| CN | 113055136 A | 6/2021 |

(Continued)

OTHER PUBLICATIONS

5gaa: "System Architecture and Solution Development; High-Accuracy Positioning for C-V2x 5GAA Automotive Association Technical Report", Feb. 9, 2021 (Feb. 9, 2021), XP093055441, section 6.3.

(Continued)

*Primary Examiner* — Qutbuddin Ghulamali
(74) *Attorney, Agent, or Firm* — Ladas & Parry, LLP

(57) ABSTRACT

A method for location acquisition is provided. The method comprises: a first terminal receives a sidelink signal configuration of a second terminal; the first terminal measures a sidelink signal of the second terminal on the basis of the sidelink signal configuration of the second terminal so as to acquire a first measurement result; and the first terminal acquires first relative location information of the first terminal and second terminal corresponding to the first measurement result.

20 Claims, 6 Drawing Sheets

(56)                    References Cited

FOREIGN PATENT DOCUMENTS

| | | |
|---|---|---|
| EP | 4054258 A1 | 9/2022 |
| WO | 2020145785 A1 | 7/2020 |
| WO | 2021030583 A1 | 2/2021 |
| WO | 2021097598 A1 | 5/2021 |
| WO | 2023004591 A1 | 2/2023 |

OTHER PUBLICATIONS

Supplementary European Search Report in the European patent application No. 21951207.6, mailed on Jul. 9, 2024.

Huawei et al., "Rel-17 work scope on NR sidelink enhancements for 5G V2X and other use case", 3GPP TSG RAN Meeting #84, RP-191011, Jun. 6, 2019 (Jun. 6, 2019), entire document.

International Search Report in the international application No. PCT/CN2021/108726, mailed on Apr. 25, 2022, with English translation.

Written Opinion of the International Search Authority in the international application No. PCT/CN2021/108726, mailed on Apr. 25, 2022, with English translation.

"3rd Generation Partnership Project; Technical Specification Group Radio Access Network; LTE Positioning Protocol (LPP) (Release 16)", 3GPP TS 37.355 V16.4.0 (Mar. 2021), section 5.1.1, 5.1.2, 5.2.4, 5.3.3, 5.3.4. 295 pages.

* cited by examiner

200

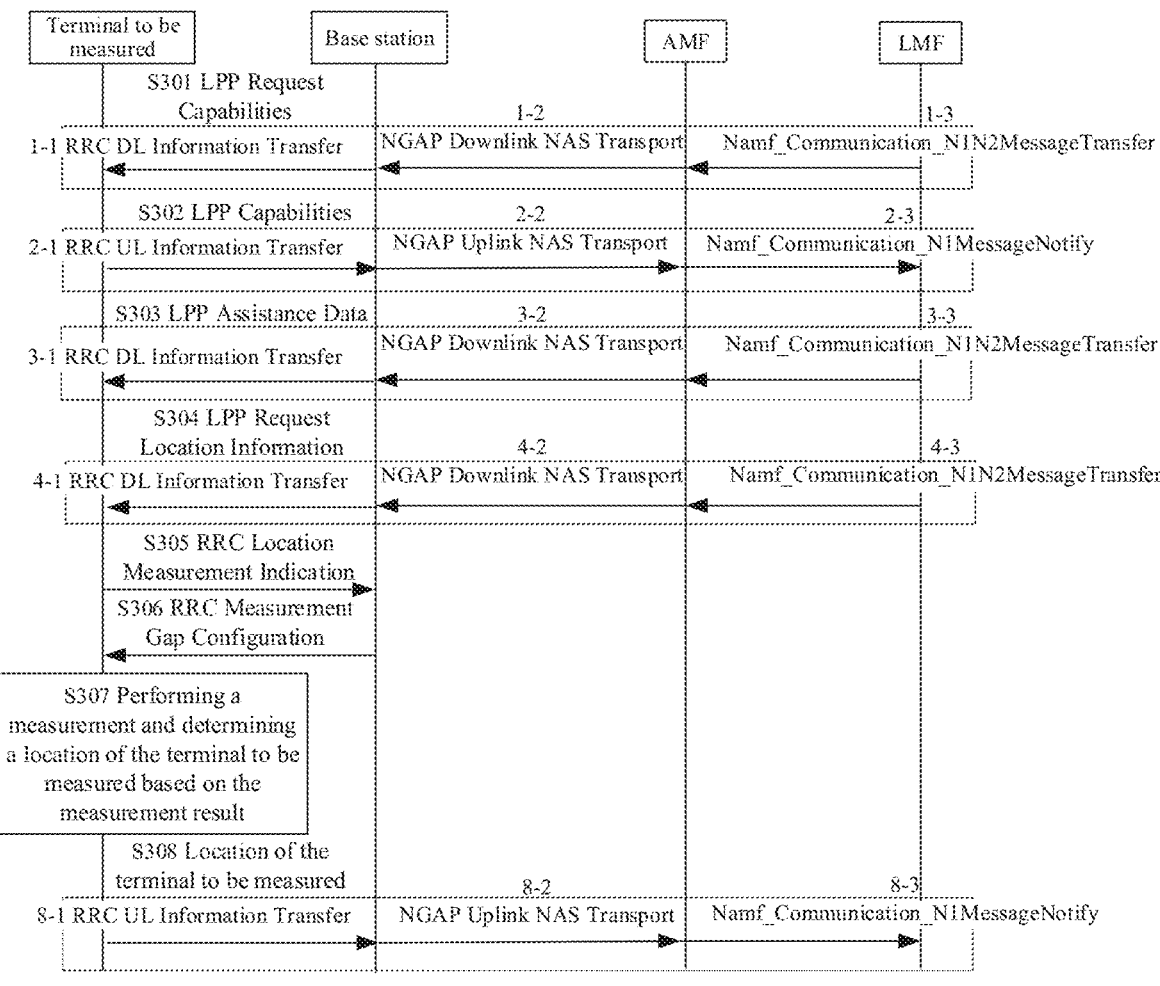

FIG. 3

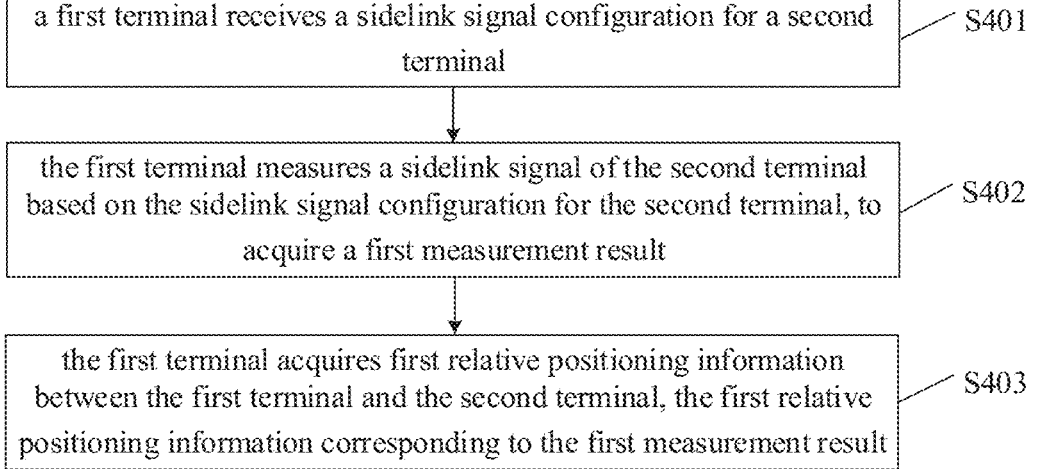

a first terminal receives a sidelink signal configuration for a second terminal — S401 the first terminal measures a sidelink signal of the second terminal based on the sidelink signal configuration for the second terminal, to acquire a first measurement result — S402 the first terminal acquires first relative positioning information between the first terminal and the second terminal, the first relative positioning information corresponding to the first measurement result — S403

FIG. 4

METHOD, APPARATUS AND DEVICE FOR LOCATION ACQUISITION, MEDIUM, CHIP, PRODUCT, AND PROGRAM

CROSS-REFERENCE TO RELATED APPLICATION

This is a continuation application of International Patent Application No. PCT/CN2021/108726, filed on Jul. 27, 2021, the content of which is hereby incorporated by reference in its entirety.

BACKGROUND

Vehicle to Everything (V2X) communication refers to communication between a vehicle and anything outside, including vehicle-to-vehicle (V2V) communication, vehicle-to-pedestrian communication (V2P), vehicle to infrastructure (V2I), and vehicle to network (V2N). Device-to-device (D2D) communication technology refers to a direct communication between two peer user nodes.

Presently, in a V2X system or a D2D system, there is no technology available for a terminal to obtain the relative positioning information between the terminal and another terminal.

SUMMARY

Embodiments of the present disclosure relate to a technical field of Sidelink (SL) communication, particularly to a method, an apparatus and a device for location acquisition, a medium, a chip, a product and a program.

Embodiments of the present disclosure provide a method, an apparatus and a device for location acquisition, a medium, a chip, a product and a program.

According to a first aspect of embodiments of the present disclosure, a method for location acquisition is provided, which includes the following operations:

a first terminal receives a sidelink signal configuration for a second terminal;

the first terminal measures a sidelink signal of the second terminal based on the sidelink signal configuration for the second terminal, to acquire a first measurement result; and the first terminal acquires first relative positioning information between the first terminal and the second terminal, the first relative positioning information corresponding to the first measurement result.

According to a second aspect of embodiments of the present disclosure, an apparatus for location acquisition is provided, which includes a transceiver and a processor.

The transceiver is configured to receive a sidelink signal configuration for a second terminal.

The processor is configured to: measure a sidelink signal of the second terminal based on the sidelink signal configuration for the second terminal, to acquire a first measurement result.

The processor is further configured to acquire first relative positioning information between the first terminal and the second terminal, the first relative positioning information corresponding to the first measurement result.

According to a third aspect of embodiments of the present disclosure, an apparatus for location acquisition is provided, which includes a transceiver.

The transceiver is configured to indicate a second terminal to send a sidelink signal configuration for the second terminal.

Here, the sidelink signal configuration for the second terminal is used for a first terminal to measure a sidelink signal of the second terminal to acquire a first measurement result; and the sidelink signal configuration for the second terminal is further used for the first terminal or the network device to acquire first relative positioning information between the first terminal and the second terminal, the first relative positioning information corresponding to the first measurement result.

BRIEF DESCRIPTION OF THE DRAWINGS

The accompany drawings constituting a part of the present disclosure provide further understanding of the present disclosure. The schematic embodiments of the present disclosure and description thereof are intended to be illustrative of the present disclosure and do not constitute an undue limitation of the present disclosure. In the accompanying drawings:

FIG. 3 is a flowchart of a positioning method according to an embodiment of the present disclosure.

FIG. 4 is a flowchart of a method for location acquisition according to an embodiment of the present disclosure.

DETAILED DESCRIPTION

The technical solutions in the embodiments of the present disclosure will be described in combination with the drawings in the embodiments of the present disclosure. It is apparent that the described embodiments are partial embodiments of the present disclosure but not all embodiments. Based on the embodiments in the present disclosure, all other embodiments obtained by those of ordinary skill in the art without creative work shall fall within the protection scope of disclosure.

A Sidelink (SL) refers to a communication link between terminals. There are two main manners for resource allocation in the sidelink: a resource allocation manner based on network scheduling and a resource allocation manner based on autonomous selection of a terminal. For such two resource allocation manners in Long Term Evolution (LTE) D2D, the resource allocation manner for allocating transmission resources based on the network is referred to as a mode 1, and the manner based on terminal autonomously selection for the transmission resources is referred to as a mode 2. In LTE V2X, such two resource allocation manners are referred to as a mode 3 (Mode 3) and a mode 4 (Mode 4); and in New Radio (NR) V2X, such two resource allocation manners are called the mode 1 (Mode 1) and the mode 2 (Mode 2).

Embodiments of the present disclosure are applied to the sidelink in NR V2X, and the terminal selects appropriate communication resources for sending and receiving data through the mode 1 or the mode 2.

Different from a traditional positioning demand for acquiring an exact location coordinate of the terminal to be measured, the method for location acquisition in the embodiments of the present disclosure is used for acquiring the relative positioning information. The purpose of acquiring the relative positioning information is to acquire distance information and/or angle information between the terminal to be measured and other terminals, to able the terminal to be measured to perform correct operations. For example, in case that the terminal to be measured is applied to a vehicle, the terminal to be measured can make correct driving strategies (such as, turning, braking, etc.). For the sidelink, the implementation of acquiring the relative positioning information may be completed by that: the terminal to be measured sends a sidelink signal, and then other target terminal measures the sidelink signal; or, other target terminal sends a sidelink signal, and then the terminal to be measured measures the sidelink signal.

Figure 1:
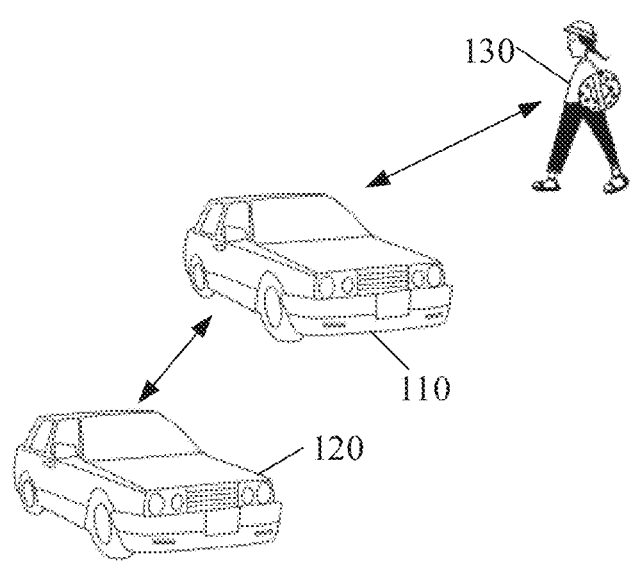
FIG. 1 is a schematic diagram of a scenario in where a terminal to be measured is located according to an embodiment of the present disclosure.

FIG. 1 is a schematic diagram of a scenario in where a terminal to be measured is located according to an embodiment of the present disclosure. As shown in FIG. 1, the terminal to be measured 110 needs to determine a relative location between itself and a lower left vehicle 120, and the relative location between itself and an upper right passerby 130, and then determine a driving strategy or modify its own driving strategy based on the two relative locations.

Figure 2:
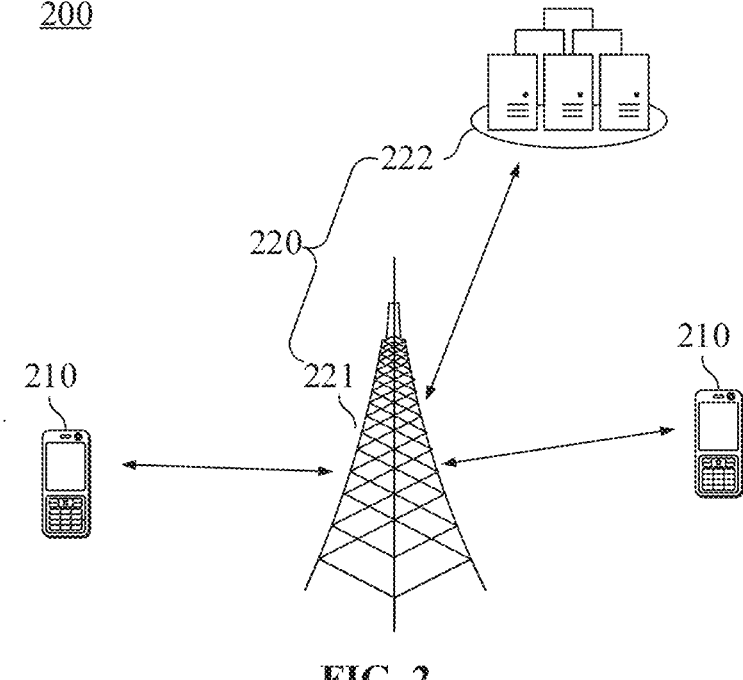
FIG. 2 is a schematic diagram of an application scenario of an embodiment of the present disclosure.

FIG. 2 is a schematic diagram of an application scenario of an embodiment of the present disclosure. As shown in FIG. 2, a communication system 200 may include terminal devices 210 and a network device 220. Different terminal devices 210 may communicate with each other through a sidelink (e.g., a V2X link or a D2D link), or the terminal devices 210 may communicate with each other through a network device. In some implementations, the terminal devices 210 may communicate with each other through one or more access devices 221. One of the terminal devices 210 may be a first terminal, a second terminal, a third terminal or a fourth terminal in the embodiments of the present disclosure. The network device 220 shown in FIG. 2 may include an access device 221 and a core network device 222. In some other embodiments, the network device 220 may include one of an access device 221 or a core network device 222.

At least one of the first terminal, the second terminal, the third terminal, or the fourth terminal in the embodiments of the present disclosure may be referred to as a User Equipment (UE), a Mobile Station (MS), or, a Mobile Terminal (MT), etc. At least one of the first terminal, the second terminal, the third terminal or the fourth terminal may include one or a combination of at least two of the following: a car; a server; a mobile phone; a pad; a computer with a wireless transceiving function; a palmtop computer; a desktop computer; a personal digital assistant; a portable media player; a smart speaker; a navigation device; a wearable device (such as a smart watch, smart glasses, a smart necklace); a pedometer; a digital TV; a Virtual Reality (VR) terminal device; an Augmented Reality (AR) terminal device; a wireless terminal in industrial control; a wireless terminal in self driving; a wireless terminal in remote medical surgery; a wireless terminal in a smart grid; a wireless terminal in transportation safety; a wireless terminal in a smart city; a wireless terminal in a smart home; or, a vehicle, an vehicle-mounted device, an vehicle-mounted module, a wireless modem, a handheld, a Customer Premise Equipment (CPE) or a smart home appliance in a vehicle to everything system.

The network device in the embodiments of the present disclosure may include an access device and/or a core network device.

The access device may include one or a combination of at least two of the following: an Evolutional Node B (eNB or eNodeB) in a Long Term Evolution (LTE) system; a Next Generation Radio Access Network (NGRAN) device; a base station (gNB), a small station, a micro station in a NR system; a wireless controller in a Cloud Radio Access Network (CRAN); an access point in Wireless-Fidelity (Wi-Fi); a transmission reception point (TRP); a relay station; an access point; a vehicle-mounted device; a wearable device; a hub; a switch; a bridge; a router; or a network device in a future evolutional Public Land Mobile Network (PLMN), etc.

The core network device may be a 5G Core (5GC) device, and the core network device may include one or a combination of at least two of the following: an Access and Mobility Management Function (AMF), an Authentication Server Function (AUSF), a User Plane Function (UPF), a Session Management Function (SMF), or a Location Management Function (LMF). In some other implementations, the core network device may also be an Evolved Packet Core (EPC) device in the LTE network, e.g., a Session Management Function+Core Packet Gateway (SMF+PGW-C) device. It should be understood that the SMF+PGW-C can achieve the same functions as the SMF and the PGW-C. During the process of network evolution, the aforementioned core network device may be further called by other names; or a new network entity may be formed by dividing the functions of the core network, which is not limited by the embodiments of the present disclosure.

Terms "system" and "network" in the present disclosure may be generally used interchangeably herein. In the present disclosure, the term "and/or" only indicates an association relationship for describing associated objects and represents that there are three relationships. For example, A and/or B may represent three conditions: independent existence of A, existence of both A and B, and independent existence of B. In addition, the character "/" in the present disclosure generally represents that previous and next associated objects form an "or" relationship. It should also be understood that, the term "indicate" referred in the embodiments of the present disclosure may be a direct indication, an indirect indication, or an indicative of an association relationship. For example, A indicates B, which may mean that A directly indicates B, e.g., B can be acquired through A. It may further mean that A indirectly indicates B, e.g., A indicates C and B can be acquired by C. It may further indicate that there is an association relationship between A and B. It should also be understood that, the term "corresponding" referred to in the embodiments of the present disclosure may mean that there is a direct correspondence or an indirect correspondence between two objects, may further mean that there is an association relationship between the two objects, may be further a relationship between the indication and the object to be indicated, or, the configuration and the object to be configured, etc. It should also be understood that, the term "predefined" or "predefined rules" referred in the embodiments of the present disclosure may be implemented by pre-storing corresponding codes, tables, or other means that may be used to indicate relevant information in a device (e.g., including a first terminal, a second terminal or a network device). The specific implementations of which are not limited by the present disclosure. For example, the "predefined" can refer to what is defined in the protocol. It should also be understood that, the term "protocol" in the embodiments of the present disclosure may refer to a standard protocol in the communication field, such as, a LTE protocol, a NR protocol, and related protocols applied in a future communication system, which are not limited herein.

In order to facilitate understanding of the technical solutions of the embodiments of the present disclosure, the related technologies involved in the embodiments of the present disclosure are described. The following related technologies as optional solutions can be arbitrarily combined with the technical solutions of the embodiments of the present disclosure, and they are within the scope of protection of the embodiments of the present disclosure.

In some embodiments of the present disclosure, the network device may include a combination of at least two of the following: a base station, an AMF, or a LMF. In some other embodiments of the present disclosure, the network device may include a LMF.

In the embodiments of the present disclosure, the first terminal sends information to the second terminal, or the second terminal sends the information to the first terminal. Without explanation, the information may be sent through a sidelink between the first terminal and the second terminal, or may be sent through a network device. The second terminal sends information to a third terminal, or the third terminal sends the information to the second terminal. Without explanation, the information may be sent through a sidelink between the second terminal and the third terminal, or may be sent through the network device.

FIG. 3 is a flowchart of a positioning method according to an embodiment of the present disclosure. As shown in FIG. 3, a protocol applied in the method shown in FIG. 3 is a LTE positioning protocol (LPP), and the method may include the following operations of S301 to S308.

In the operation S301, a LMF sends a LPP capability request (LPP Request Capabilities) to a terminal to be measured.

Here, the LPP capability request is used to inquire about a positioning capability of the terminal to be measured.

In the operation S302, the terminal to be measured sends LPP capabilities to the LMF.

Here, the LPP capability is used to indicate that the terminal to be measured has the positioning capability or does not have the positioning capability.

In case that the LPP capability is used to indicate that the terminal to be measured has the positioning capability, the operation S303 is performed.

In the operation S303, the LMF sends LPP assistance data to the terminal to be measured.

The LPP assistance data may include a Positioning Reference Signal (PRS) configuration of an anchor TRP and/or location information of the anchor TRP. The PRS configuration may be further referred to as a PRS resource configuration, and the PRS configuration may include or indicate location information in time domain of the PRS resource and/or frequency domain of the PRS resource. In some implementations, the PRS may be referred to as a Sidelink PRS (SPRS).

In the operation S304, the LMF sends a LPP request location information to the terminal to be measured.

The LPP request location information is used for at least one of the following: requesting the terminal to be measured to report a measurement result, or requesting the terminal to be measured to perform a measurement.

In some implementations, in case that the communication between the configured PRS and the present terminal's uu port involves across-carrier frequencies, the operations S305 and S306 may be further performed.

In the operation S305, the terminal to be measured may send Radio Resource Control (RRC) Location Measurement Indication to a base station.

In the operation S306, the base station sends RRC measurement gap configuration to the terminal to be measured.

In the operation S307, the terminal to be measured performs a measurement to acquire a measurement result, and the terminal to be measured further determines a location of the terminal to be measured based on the measurement result.

In the operation S308, the terminal to be measured sends the location of the terminal to be measured to the LMF.

In some implementations, the S308 may be further replaced by the following operations: the terminal to be measured sends the measurement result to the LMF; the LMF determines the location of the terminal to be measured; and the LMF sends the location of the terminal to be measured to the terminal to be measured.

In some implementations, the LMF sends, through the AMF and the base station successively, information to the terminal to be measured. For example, the LMF sends the information to the AMF through a Namf_Communication_N1N2 message transfer (Namf_Communication_N1N2MessageTransfer). The AMF sends the information to the base station through a Next Generation ApplicationProtocol (NGAP) Downlink Non Access Stratum (NAS) transport (Downlink NAS Transport), and the base station sends the information to the terminal to be measured through a RRC downlink information transfer (DL Information Transfer).

The terminal to be measured sends, through the base station and the AMF successively, the information to the LMF. For example, the terminal to be measured sends the information to the base station through a RRC uplink information transfer (UL Information Transfer), the base station sends the information to the AMF through a NGAP uplink NAS transport, and the AMF sends the information to the LMF through a Namf_Communication_N1 message notification (Namf_Communication_N1MessageNotify).

In some implementations, the operations S301 and S302 may not be performed. In some implementations, the operations S305 and S306 may not be performed.

A first terminal, a second terminal, a third terminal or a fourth terminal in the embodiments of the present disclosure may be the terminal device or the terminal to be measured in the aforementioned embodiments.

In order to understand the technical solutions of the embodiments of the present disclosure, the technical solutions of the present disclosure will be described in detail below by way of specific embodiments. The aforementioned technologies as an optional solution may be arbitrarily combined with the technical solutions of the embodiments of the present disclosure, and all of them belong to the protection scope of the embodiments of the present disclosure. Embodiments of the present disclosure include at least some of the following.

FIG. 4 is a flowchart of a method for location acquisition according to an embodiment of the present disclosure. As shown in FIG. 4, the method includes the following operations S401 to S403.

In the operation S401, a first terminal receives a sidelink signal configuration for a second terminal.

The sidelink signal configuration may be referred to as configuration information of a sidelink signal. The sidelink signal configuration may indicate resources occupied by the sidelink signal. The sidelink signal configuration may include position information of the sidelink signal, and position information of the sidelink signal may include at least one of the following: a sending time, a sending interval, a sending period, a time-domain position, or a frequency-domain position.

The sidelink signal includes at least one of the following: a Sidelink-Positioning Reference Signal (S-PRS), a sidelink Demodulation Reference Signal (DMRS), a sidelink ranging reference signal (SR-RS), a sidelink Sounding Reference Signal (SRS), or a sidelink Channel State Information (CSI) reference signal. The S-PRS may be further referred to as a PRS in some other embodiments.

The first terminal may determine the second terminal in the following manner. In some embodiments, each of multiple terminals broadcasts a reference signal, the first terminal determines whether a quality of a detected reference signal from the respective one of the multiple terminals is greater than a threshold. The first terminal then determines the terminal corresponding to the quality of the reference signal greater than the threshold as the second terminal. In some other embodiments, the first terminal receives an identification of the second terminal from a network device. In some further embodiments, the first terminal determines a distance between the first terminal and the multiple terminals through a laser radar, and further determines the terminal corresponding to the distance satisfying a threshold (e.g., a distance less than the threshold) as the second terminal. In some further embodiments, the first terminal may photograph surrounding scenarios through a camera, and the first terminal may determine the second terminal through photographed images.

In the operation S402, the first terminal measures a sidelink signal of the second terminal based on the sidelink signal configuration for the second terminal, to acquire a first measurement result.

The second terminal may broadcast the sidelink signal based on the sidelink signal configuration for the second terminal, and the first terminal may receive the sidelink signal (broadcasted by the second terminal) based on the sidelink signal configuration for the second terminal. In such way, the second terminal may broadcast the sidelink signal. In some other embodiments, the second terminal may send the sidelink signal to the first terminal independently, or the second terminal may send the sidelink signal to each of a group of terminals including the first terminal.

The first terminal may determine a first measurement result based on a signal quality and/or a signal strength of the sidelink signal received from the second terminal. For example, the first terminal may determine the first measurement result based on one of the following corresponding to the sidelink signal: a Reference Signal Receiving Power (RSRP), a Reference Single Strength Indicator (RSSI), a Reference Signal Receiving Quality (RSRQ), or a Signal to Interference plus Noise Ratio (SINR).

In some implementations, any of the measurement results may be referred to as a measurement report, or, such measurement result may be included in the measurement report.

In the operation S403, the first terminal acquires first relative positioning information between the first terminal and the second terminal, where the first relative positioning information corresponds to the first measurement result.

Any relative positioning information (e.g., the first relative positioning information, second relative positioning information mentioned below, or third relative positioning information mentioned below) may include a distance and/or an angle.

In some implementations, the first terminal may include a receiving module, and the receiving module may be configured to determine a distance between the first terminal and the second terminal by receiving the sidelink signal from the second terminal. In some other implementations, the first terminal may include multiple receiving modules. Each of the multiple receiving modules may be configured to receive the sidelink signal from the second device, and further determine a distance and/or an angle between the first terminal and the second terminal based on a respective sidelink signal received by each of the multiple receiving modules from the second terminal.

In case that the first terminal acquires the first relative positioning information, it may be enabled to plan, based on the first relative positioning information, a path for one of the following: the first terminal, a device mounted with the first terminal, or a device carrying the first terminal, so as to avoid or approach the second terminal, a device mounted with the second terminal, or a device carrying the second terminal.

In the embodiments of the present disclosure, the first terminal can measure, based on the sidelink signal configuration for the second terminal, the sidelink signal of the second terminal to acquire the first measurement result. The first terminal can further acquire the first relative positioning information (corresponding to the first measurement result) between the first terminal and the second terminal. Therefore, the first terminal can determine the first relative positioning information by measuring the sidelink signal of the second terminal; as such, the first relative positioning information between the first terminal and the second terminal can be accurately determined.

In some embodiments, the second terminal may send the sidelink signal configuration for the second terminal. Here, the sidelink signal configuration for the second terminal is used for a first terminal to measure a sidelink signal of the second terminal to acquire a first measurement result. The sidelink signal configuration for the second terminal is further used for the first terminal or a network device to acquire first relative positioning information between the first terminal and the second terminal, the first relative positioning information corresponding to the first measurement result.

In some embodiments, the operation S401 may include that: the first terminal may receive the sidelink signal configuration for the second terminal from the network device. In such case, the second terminal may receive a fifth request from the network device, where the fifth request is used for requesting the sidelink signal configuration for the second terminal. The second terminal may further send the sidelink signal configuration for the second terminal to the network device, where the sidelink signal configuration for the second terminal is used to be sent by the network device to the first terminal. In such way, the second terminal may send the sidelink signal configuration to the first terminal through the network device. In such case, the network device may indicate the second terminal to send the sidelink signal configuration for the second terminal. Here, the sidelink signal configuration for the second terminal is used for a first terminal to measure the sidelink signal of the second terminal to acquire the first measurement result. The sidelink signal configuration for the second terminal is further used for the first terminal or the network device to acquire first relative positioning information (corresponding to the first measurement result) between the first terminal and the second terminal. One implementation for the network device to indicate the second terminal to send the sidelink signal configuration for the second terminal may be that: the network device may send the fifth request to the second terminal. Here, the fifth request is used for requesting the sidelink signal configuration for the second terminal; the network device may receive the sidelink signal configuration for the second terminal from the second terminal; and the network device may send the sidelink signal configuration for the second terminal to the first terminal. Thus, the network device may act as an intermediate device to able the second terminal to send the sidelink signal configuration for the second terminal to the first terminal.

In some other embodiments, the operation S401 may include that: the first terminal may receive the sidelink signal configuration for the second terminal from the second terminal through a sidelink between the first terminal and the second terminal. In such case, the second terminal may send the sidelink signal configuration for the second terminal to the first terminal through the sidelink between the first terminal and the second terminal. In such way, the second terminal may send the sidelink signal configuration for the second terminal to the first terminal through the sidelink (or a direct communication link) between the first terminal and the second terminal.

During the implementation, the sidelink between the first terminal and the second terminal may be established in advance. For example, the network device may send indication information to the first terminal and/or the second terminal, so that the first terminal and/or the second terminal may establish the sidelink based on the indication information. Thus, the first terminal and the second terminal can communicate with each other based on the sidelink.

For the network device, the network device may, in one case, send first indication information to the first terminal, where the first indication information indicates an establishment of the sidelink between the first terminal and the second terminal. The network device indicates the second terminal to send the sidelink signal configuration for the second terminal to the first terminal through the sidelink between the first terminal and the second terminal. In such case, the first indication information may include or indicate an identification of the second terminal and/or an authentication information of the second terminal, etc. In another case, the network device may send fifth indication information to the second terminal, where the fifth indication information indicates the establishment of the sidelink between the first terminal and the second terminal. The network device may indicate the second terminal to send the sidelink signal configuration for the second terminal to the first terminal through the sidelink between the first terminal and the second terminal. In such case, the fifth indication information may include or indicate an identification of the first terminal and/or an authentication information of the first terminal, etc.

For the first terminal, the first terminal receives the first indication information from the network device, where the first indication information indicates the establishment of the sidelink between the first terminal and the second terminal. The first terminal establishes the sidelink between the first terminal and the second terminal based on the first indication information. In one case, after establishing the sidelink between the first terminal and the second terminal, the first terminal may receive the sidelink signal configuration for the second terminal from the second terminal. In another case, after establishing the sidelink between the first terminal and the second terminal, the first terminal may send information for requesting the sidelink signal configuration for the second terminal to the second terminal, to receive the sidelink signal configuration for the second terminal from the second terminal.

For the second terminal, the second terminal receives the fifth indication information from the network device, where the fifth indication information indicates the establishment of the sidelink between the second terminal and the first terminal. The second terminal may establish the sidelink between the second terminal and the first terminal based on the fifth indication information. In one case, after establishing the sidelink between the second terminal and the first terminal, the second terminal may send the sidelink signal configuration for the second terminal to the first terminal through the sidelink. In another case, after establishing the sidelink between the second terminal and the first terminal, the second terminal may receive from the network device an indication for indicating the second terminal to send the sidelink signal configuration for the second terminal to the first terminal through the sidelink between the first terminal and the second terminal. In response to the indication, the second terminal may send the sidelink signal configuration for the second terminal to the first terminal through the sidelink. In a further case, after establishing the sidelink between the second terminal and the first terminal, the second terminal may receive the information for requesting the sidelink signal configuration for the second terminal from the first terminal. Thus, the first terminal can receive the sidelink signal configuration for the second terminal from the second terminal.

After completing the establishment of the sidelink between the first terminal and the second terminal based on the indication information sent by the network device, the first terminal or the second terminal may send a feedback for a successful establishment or an unsuccessful establishment to the network device.

For the first terminal or the second terminal, the first terminal or the second terminal may send feedback information to the network device. The feedback information indicates at least one of that: the establishment of the sidelink between the first terminal and the second terminal is completed; the first terminal receives the sidelink signal configuration for the second terminal from the second terminal; or the second terminal receives from the first terminal the feedback that the first terminal successfully receives the sidelink signal configuration for the second terminal. In some other implementations, the first terminal or the second terminal may send a feedback for an unsuccessful establishment and/or causes for the failure to the network device, so that the network device may send, based on the feedback for an unsuccessful establishment and/or the causes for the failure, another first indication information or another fifth indication information to the first terminal or the second terminal, to enable an successful establishment of the sidelink between the first terminal and the second terminal.

Alternatively, by taking the network device as the intermediate device, the first terminal may be enabled to acquire the sidelink signal configuration for the second terminal.

For the network device, the network device receives feedback information from the first terminal or the second terminal. The feedback information indicates at least one of that: the establishment of the sidelink between the first terminal and the second terminal is completed; or, the first terminal receives the sidelink signal configuration for the second terminal from the second terminal. In some other implementations, the network device may receive the feedback for an unsuccessful establishment and/or the causes for the failure from the first terminal or the second terminal.

During the implementation, each of the first terminal, the second terminal and the network device may determine the first relative positioning information based on the first measurement result.

Embodiments in which the first terminal determines the first relative positioning information based on the first measurement result are described below.

In some embodiments, the operation S403 may include that: the first terminal may determine the first relative positioning information based on the first measurement result. In case that the first terminal acquires the first relative positioning information, the first terminal may send the first relative positioning information to the network device or the second terminal. Thus, the network device may receive the first relative positioning information from the first terminal. Therefore, by the first terminal determining the first relative positioning information and sending the first relative positioning information to the network device, the network device can acquire the first relative positioning information.

Embodiments in which the second terminal determines the first relative positioning information based on the first measurement result are described below.

In some embodiments, the second terminal may receive the first measurement result from the first terminal through the sidelink between the second terminal and the first terminal. The second terminal may determine the first relative positioning information based on the first measurement result; and the second terminal may send the first relative positioning information to the first terminal through the sidelink between the second terminal and the first terminal. In such case, the first terminal may send the first measurement result to the second terminal (through the sidelink or through the network device), where the first measurement result is used for the second terminal to determine the first relative positioning information between the first terminal and the second terminal. The first terminal may receive the first relative positioning information from the second terminal.

In some other embodiments, the second terminal may receive the first measurement result from the network device, where the first measurement result is sent by the first terminal to the network device. The second terminal may determine the first relative positioning information based on the first measurement result. The second terminal may send the first relative positioning information to the network device, where the first relative positioning information is used to be sent by the network device to the first terminal.

In some implementations, in case that the second terminal determines the first relative positioning information, the second terminal may further send the first relative positioning information to the network device. In some implementations, the second terminal may further send to the first terminal an indication that the first relative positioning information has been sent to the network device. Thus, the first terminal does not need to send the first relative positioning information again to the network device. In some implementations, after sending the first relative positioning information to the network device and receiving acknowledgement information for the first relative positioning information from the network device, the second terminal may send to the first terminal the information that the first relative positioning information has been successfully sent to the network device. In some implementations, the second terminal may send to the first terminal the information for indicating the first terminal to send the first relative positioning information to the network device.

Embodiments in which the network device determines the first relative positioning information based on the first measurement result are described below.

The first terminal may send the first measurement result to the network device, where the first measurement result is used for the network device to determine the first relative positioning information between the first terminal and the second terminal. The first terminal may receive the first relative positioning information from the network device. Thus, the network device may receive the first measurement result from the first terminal; the network device may determine the first relative positioning information based on the first measurement result; and the network device may send the first relative positioning information to the first terminal. In some implementations, the network device may further send the first relative positioning information to the second terminal. In some implementations, the network device may further indicate the first terminal to send the first relative positioning information to the second terminal. In some implementations, the network device may receive the first measurement result from the first terminal through the second terminal; and the network device may send the first relative positioning information to the first terminal through the second terminal.

In case that the network device includes the LMF, the network device may further receive from a mobility management function (AMF) and/or a fourth terminal a sixth request for requesting the first relative positioning information. The network device may send the first relative positioning information to the AMF and/or the fourth terminal. The fourth terminal may be referred to as an external terminal. In case that the AMF acquires the first relative positioning information, the AMF may implement other mobility management functions.

The first terminal will have a positioning capability. In some embodiments, the first terminal may receive a positioning capability request from the network device; and the first terminal may send a message comprising a positioning capability or a sidelink-based positioning capability to the network device. For the network device, the network device may send the positioning capability request to the first terminal; and the network device may receive the message comprising the positioning capability or the sidelink-based positioning capability from the first terminal.

Broadcasting the sidelink signal by the second terminal is performed under being triggered.

In some embodiments, the second terminal may receive an activation request for the sidelink signal from the network device, broadcast the sidelink signal, or unicast the sidelink signal to the first terminal. For example, the second terminal may receive the activation request for the sidelink signal from the network device; in response to the activation request for the sidelink signal, the second terminal may broadcast the sidelink signal, or unicast the sidelink signal to the first terminal; and the second terminal may send an activation response for the sidelink signal to the network device. Thus, the network device may send the activation request for the sidelink signal to the second terminal; and the network device may receive the activation response for the sidelink signal from the second terminal.

In some other embodiments, through the sidelink between the first terminal and the second terminal, the second terminal may receive the activation request for the sidelink signal from the first terminal, broadcast the sidelink signal or unicast the sidelink signal to the first terminal.

In some further embodiments, after sending the sidelink signal configuration for the second terminal, the second terminal may broadcast the sidelink signal, or unicast the sidelink signal to the first terminal.

In some other embodiments, the second terminal may, periodically or non-periodically at all times, broadcast the sidelink signal or unicast the sidelink signal to the first terminal.

When triggered, the first terminal may measure the sidelink signal of the second terminal.

In some embodiments, the network device may send a measurement request to the first terminal, where the measurement request indicates the first terminal to measure the sidelink signal of the second terminal. Thus, in case that the first terminal receives the measurement request from the network device, the first terminal may measure the sidelink signal of the second terminal based on the sidelink signal configuration for the second terminal.

In some other embodiments, the second terminal may send the measurement request to the first terminal through the sidelink. Thus, in case that the first terminal receives the measurement request from the second terminal, the first terminal may measure the sidelink signal of the second terminal based on the sidelink signal configuration for the second terminal. In some implementations, after broadcasting the sidelink signal or unicasting the sidelink signal to the first terminal, the second terminal may send the measurement request to the first terminal.

In some scenarios, the first terminal may send a relative positioning demand towards the second terminal to the network device.

The first terminal may send a first request to the network device, where the first request indicates the relative positioning demand towards the second terminal. The network device may receive the first request from the first terminal, where the first request indicates the relative positioning demand towards the second terminal. Here, the relative positioning demand towards the second terminal may be referred to as a demand for acquiring the first relative positioning information. Thus, in case that the network device acquires the first relative positioning information, the network device may send the first relative positioning information to the first terminal.

In some embodiments, the first request may include or indicate at least one of an identification of the second terminal, or an identification of a Road Side Unit (RSU) corresponding to the second terminal.

In some other embodiments, the first request may not carry the identification of the second terminal and/or the identification of the RSU corresponding to the second terminal. Thus, the network device may send a second request to the first terminal, where the second request is used for requesting the identification of the second terminal and/or the identification of the road side unit corresponding to the second terminal. The first terminal may receive the second request from the network device; and the first terminal may send to the network device the identification of the second terminal and/or the identification of the road side unit corresponding to the second terminal. Thus, the network device may receive from the first terminal the identification of the second terminal and/or the identification of the road side unit corresponding to the second terminal.

In some other scenarios, the second terminal may send a relative positioning demand towards the first terminal to the network device.

The second terminal may send to the network device a sixth request for indicating the relative positioning demand towards the first terminal. The network device may receive the sixth request from the second terminal; and the network device may send the first relative positioning information to the second terminal. The second terminal may receive the first relative positioning information between the first terminal and the second terminal from the network device. Here, the relative positioning demand towards the first terminal may be referred to as a demand for acquiring the first relative positioning information.

In some embodiments, the sixth request may include or indicate at least one of the following: an identification of the first terminal, or an identification of a road side unit corresponding to the first terminal.

In some other embodiments, the sixth request may not carry the identification of the first terminal and/or the identification of the RSU corresponding to the first terminal. Thus, the network device may send a seventh request to the second terminal, where the seventh request is used for requesting the identification of the first terminal and/or the identification of the road side unit corresponding to the first terminal. The second terminal may receive the seventh request from the network device; and the second terminal may send to the network device the identification of the first terminal and/or the identification of the road side unit corresponding to the first terminal. The network device may receive from the second terminal the identification of the first terminal and/or the identification of the road side unit corresponding to the first terminal.

Embodiments in which the first terminal acquires third relative positioning information between the first terminal and a third terminal are described below.

In some embodiments, the first terminal may receive second relative positioning information between the second terminal and the third terminal from the second terminal or the network device. The first terminal may acquire the third relative positioning information between the first terminal and the third terminal, where the third relative positioning information are determined based on the first relative positioning information and the second relative positioning information.

The first terminal may receive the second relative positioning information from the second terminal through the sidelink between the first terminal and the second terminal. Alternatively, the second terminal may send the second relative positioning information to the network device, such that the network device may send the second relative positioning information to the first terminal.

The manner of second terminal acquiring the second relative positioning information is similar to the manner of the first terminal acquiring the first relative positioning information. For example, the second terminal may measure the sidelink signal of the third terminal through the sidelink signal configuration for the third terminal, to acquire a second measurement result; and determine the second relative positioning information based on the second measurement result. For another example, the second terminal may send the second measurement result to the third terminal or the network device, and receive the second relative positioning information from the third terminal or the network device.

An embodiment in which the second terminal sends the second relative positioning information to the first terminal are described below. The second terminal may receive a sidelink signal configuration for the third terminal. The second terminal may measure a sidelink signal of the third terminal based on the sidelink signal configuration for the third terminal, to acquire the second measurement result. The second terminal may acquire the second relative positioning information between the second terminal and the third terminal based on the second measurement result. The second terminal may send the second relative positioning information to the first terminal, or, the second terminal may send the second relative positioning information to the network device. Here, the second relative positioning information is used to be sent by the network device to the first terminal, or used for the network device to determine the third positioning information.

For the network device, the network device may receive the second relative positioning information between the second terminal and the third terminal from the second terminal; and the network device may send the second relative positioning information to the first terminal.

In some implementations, the second relative positioning information may be sent by the third terminal to the network device. For example, the network device may receive the second relative positioning information between the second terminal and the third terminal from the third terminal; and the network device may send the second relative positioning information to the first terminal.

The manner of the third terminal determining the second relative positioning information is similar to the manner of the first terminal determining the first relative positioning information, or the manner of the second terminal determining the second relative positioning information. For example, the third terminal may measure the sidelink signal of the second terminal based on the sidelink signal configuration for the second terminal, to acquire a third measurement result; and the third terminal may determine the second relative positioning information based on the third measurement result.

For the first terminal, the first terminal may receive the second measurement result or the third measurement result from the second terminal or the network device. Here, the second measurement result is acquired by the second terminal measuring a sidelink signal of a third terminal based on a sidelink signal configuration for the third terminal, the third measurement result is acquired by the third terminal measuring the sidelink signal of the second terminal based on the sidelink signal configuration for the second terminal. The first terminal may acquire the third relative positioning information between the first terminal and the third terminal. Here, the third relative positioning information is determined based on the first measurement result and the second measurement result, or the third relative positioning information is determined based on the first measurement result and the third measurement result.

Here, the first terminal may receive the second measurement result or the third measurement result from the second terminal through the sidelink between the first terminal and the second terminal. Alternatively, the first terminal may receive the second measurement result or the third measurement result from the second terminal through the network device.

In some embodiments, the first terminal may determine the third relative positioning information based on the first measurement result and the second measurement result or based on the first measurement result and the third measurement result.

In some other embodiments, the first terminal may send the first measurement result to the network device or the second terminal; or, the first terminal may send the first measurement result and the second measurement result; or, the first terminal may send the first measurement result and the third measurement result. Here, the first measurement result and the second measurement result, or the first measurement result and the third measurement result, are used for the network device or the second terminal to determine the third relative positioning information. The first terminal may receive the third relative positioning information from the network device or the second terminal.

For the second terminal, an implementation in which the second terminal sends the measurement result or the second relative positioning information to the first terminal are explained.

In some embodiments, the second terminal may send the second measurement result to the first terminal. For example, the second terminal may receive the sidelink signal configuration for the third terminal; and the second terminal may measure the sidelink signal of the third terminal based on the sidelink signal configuration for the third terminal, to acquire the second measurement result. The second terminal may send the second measurement result to the first terminal; or, the second terminal may send the second measurement result to the network device, where the second measurement result is used to be sent by the network device to the first terminal.

In some other implementations, the second terminal may send the third measurement result or the second relative positioning information to the first terminal. For example, the second terminal may send the sidelink signal configuration for the second terminal to the third terminal; or the second terminal may send the sidelink signal configuration for the second terminal to the third terminal through the network device. Here, the sidelink signal configuration for the second terminal is used for the third terminal to measure the sidelink signal of the second terminal and determine the third measurement result or the second relative positioning information. The second terminal may receive the third measurement result or the second relative positioning information from the third terminal; or, the second terminal may receive the third measurement result or the second relative positioning information from the third terminal through the network device. The second terminal may send the third measurement result or the second relative positioning information to the first terminal; or, the second terminal may send the third measurement result or the second relative positioning information to the first terminal through the network device.

In some embodiments, the second terminal may determine, based on the indication from the first terminal, to send to the first terminal one of the following: the second relative positioning information, the second measurement result, or the third measurement result. For example, the second terminal may receive fourth indication information from the first terminal. Here, the fourth indication information is used for indicating: the second terminal to determine and send to the first terminal one of the second relative positioning information, the second measurement result, or the third measurement result; or the second terminal to determine and send, to the first terminal through the network device, one of the second relative positioning information, the second measurement result, or the third measurement result.

In some further implementations, the second terminal may determine the third relative positioning information based on the measurement result. For example, the second terminal may receive from the first terminal or the network device one of the following: the first measurement result; the first measurement result and the second measurement result; or the first measurement result and the third measurement result. Here, the second measurement result is acquired by the second terminal measuring a sidelink signal of a third terminal based on a sidelink signal configuration for the third terminal, the third measurement result is acquired by the third terminal measuring the sidelink signal of the second terminal based on the sidelink signal configuration for the second terminal. The second terminal may determine the third relative positioning information between the first terminal and the third terminal based on the first measurement result and the second measurement result or based on the first measurement result and the third measurement result. The second terminal may send the third relative positioning information to the first terminal; or the second terminal may send the third relative positioning information to the first terminal through the network device.

Here, the second terminal may receive from the first terminal, through the sidelink between the second terminal and the first terminal, one of the following: the first measurement result; the first measurement result and the second measurement result; or the first measurement result and the third measurement result. The second terminal may send the third relative positioning information to the first terminal through the sidelink between the second terminal and the first terminal.

In some implementations, the second terminal may determines the third relative positioning information based on the first relative positioning information and the second relative positioning information. For example, the second terminal may receive from the first terminal or from the network device, the first relative positioning information, and second relative positioning information between the second terminal and a third terminal. The second terminal may determine the third relative positioning information between the first terminal and the third terminal based on the first relative positioning information and the second relative positioning information. The second terminal may send the third relative positioning information to the first terminal; or the second terminal may send the third relative positioning information to the first terminal through the network device.

For the network device, in some implementations, the network device may receive the second relative positioning information between the second terminal and the third terminal from the second terminal or the third terminal. The network device may further send the second relative positioning information to the first terminal.

In some implementations, the network device may receive the second measurement result from the second terminal or the third measurement result from the third terminal. Here, the second measurement result is acquired by the second terminal measuring a sidelink signal of the third terminal based on a sidelink signal configuration for the third terminal. The third measurement result is acquired by the third terminal measuring the sidelink signal of the second terminal based on the sidelink signal configuration for the second terminal. The network device may send the second measurement result or the third measurement result to the first terminal.

In some further embodiments, the network device may receive from the first terminal one of the following: the first measurement result; the first measurement result and the second measurement result; or, the first measurement result and the third measurement result. The network device may determine the third relative positioning information between the first terminal and the third terminal based on the first measurement result and the second measurement result or based on the first measurement result and the third measurement result. The network device may send the third relative positioning information to the first terminal.

In some further implementations, the network device may receive the second relative positioning information between the second terminal and the third terminal from the second terminal or the third terminal. The network device may further send to the first terminal: the second relative positioning information; or the first relative positioning information and the second relative positioning information which are used for the first terminal to determine third relative positioning information between the first terminal and the third terminal. The network device may determine the third relative positioning information between the first terminal and the third terminal based on the first relative positioning information and the second relative positioning information. The network device may send the third relative positioning information to the first terminal.

An implementation in which the first terminal determines the second terminal from multiple terminal are described below.

For the first terminal, in some embodiments, the first terminal may determine the second terminal from the multiple terminals based on multiple pieces of second indication information, each of the plurality pieces of second indication information is sent by a respective one of the multiple terminals. Here, the second indication information indicates at least one of the following:

third measurement result, the third measurement result being acquired by the second terminal measuring a reference signal of the third terminal;

signal strength level of the reference signal of the third terminal, which is determined based on the third measurement result;

whether a data transmission exists between the second terminal and the third terminal; or, whether a communication connection is able to be established between the second terminal and the third terminal.

Accordingly, for the network device, the network device may receive a third request from the first terminal, where the third request indicates each of the multiple terminals within an area corresponding to the network device to broadcast a respective one of the multiple pieces of second indication information. The network device may send sixth indication information to each of the multiple terminals, where the sixth indication information indicates to broadcast the second indication information.

In some implementations, the first terminal may send a third request to the network device, where the third request indicates each of the multiple terminals in an area corresponding to the network device to broadcast a respective one of the multiple pieces of the second indication information.

In some embodiments, the first terminal may receive the plurality pieces of third indication information from the network device; and the first terminal may determine the second terminal from the multiple terminals based on the plurality pieces of third indication information. Here, each of the plurality pieces of third indication information is sent to the network device by a respective one of multiple terminals within an area corresponding to the network device.

Here, the third indication information indicates at least one of the following:

a fourth measurement result, the fourth measurement result being acquired by the second terminal measuring a reference signal of the third terminal and/or a reference signal of the first terminal;

a signal strength level of the reference signal of the third terminal, which is determined based on the fourth measurement result; and/or a signal strength level of the reference signal of the first terminal, which is determined based on the fourth measurement result;

whether a data transmission exists between the second terminal and the third terminal, and/or, whether a data transmission exists between the second terminal and the first terminal;

whether a communication connection is able to be established between the second terminal and the third terminal; and/or, whether a communication connection is able to be established between the second terminal and the first terminal.

Accordingly, for the network device, the network device may receive the plurality pieces of third indication information, where each of the plurality pieces of third indication information is sent by a respective one of multiple terminals within an area corresponding to the network device. The network device may send the plurality pieces of the third indication information to the first terminal. Alternatively, the network device may determine the second terminal from the multiple terminals based on the plurality pieces of the third indication information, and the network device may send an identification of the second terminal to the first terminal.

In some implementations, the first terminal may send fourth indication information to the second terminal, or the first terminal may send the fourth indication information to the second terminal through the network device. Here, the fourth indication information is used for indicating: the second terminal to determine and send to the first terminal one of the second relative positioning information, the second measurement result, or the third measurement result; or the second terminal to determine and send, to the first terminal through the network device, one of the second relative positioning information, the second measurement result, or the third measurement result.

In some embodiments, the first terminal may send a fourth request to the network device, where the fourth request indicates a relative positioning demand towards the third terminal. Thus, the network device may receive the fourth request from the first terminal.

Figure 5:
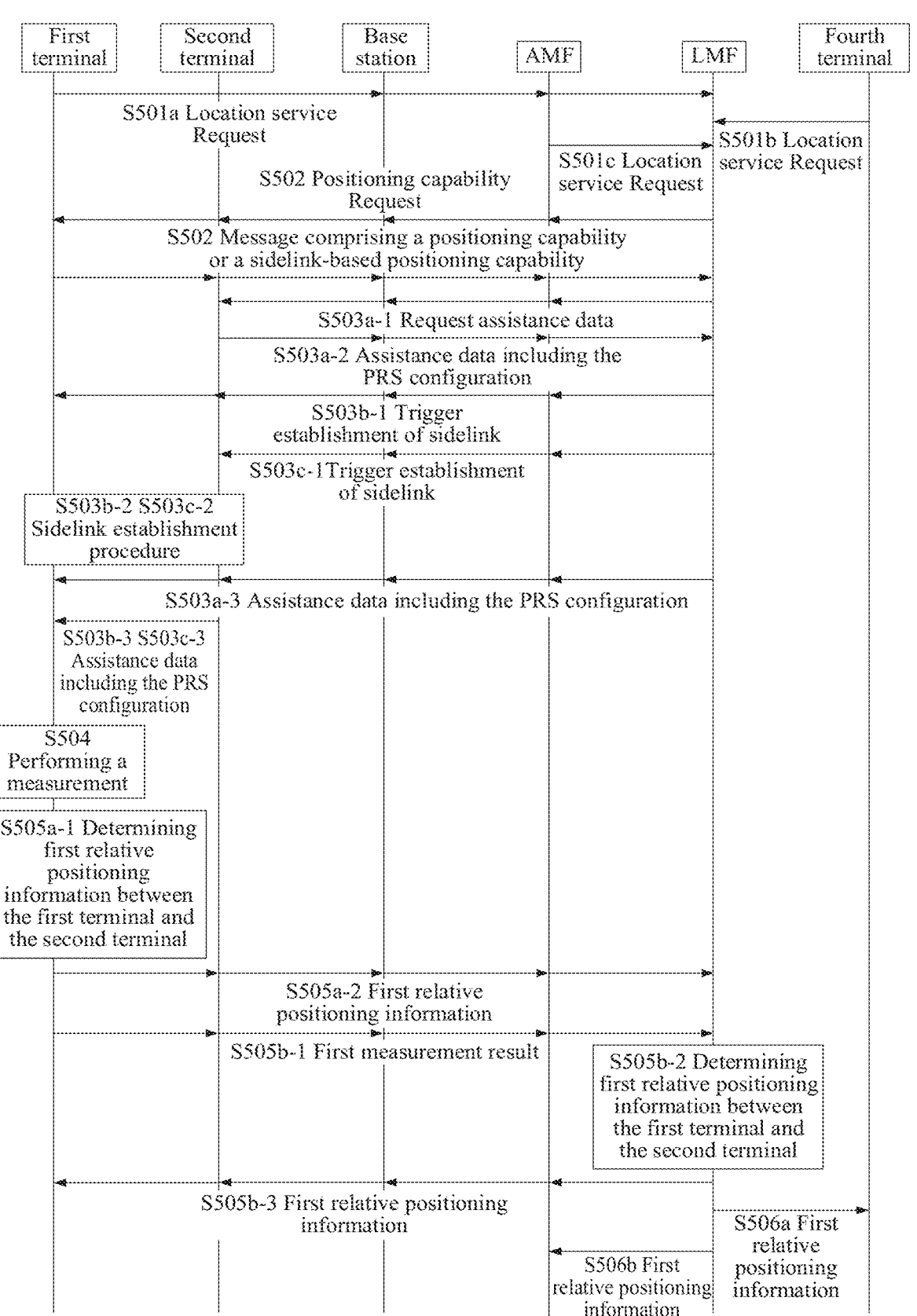
FIG. 5 is a flowchart of another method for location acquisition according to an embodiment of the present disclosure.

FIG. 5 is a flowchart of another method for location acquisition according to an embodiment of the present disclosure. As shown in FIG. 5, the method includes the following operations.

In an operation S501a, a first terminal sends a location service request to a LMF.

The location service request may be the first request in the aforementioned embodiments, where the first request indicates the relative positioning demand towards the second terminal. The location service request may include a relative positioning demand of the first terminal to a second terminal (relative positioning demand towards target UE/RSU). The second terminal in FIG. 5 may be a target UE/RSU.

In an operation S501b, a fourth terminal sends the location service request to the LMF.

In an operation S501c, an AMF sends the location service request to the LMF.

Thereafter, as shown in the S502, a capability inquiry procedure for the first terminal is entered.

In the operation S502, the LMF sends a positioning capability request to the first terminal; and the first terminal sends a message comprising a positioning capability or a sidelink-based positioning capability to the LMF.

After the operation of S502, one of operations of S503a, S503b, or S503c may be performed.

The operation S503a may include operations of S503a-1, S503a-2 and S503a-3.

In the operation S503a-1, the LMF sends a request (Request assistance data) for requesting an assistance data including a PRS configuration to the second terminal.

In the operation S503a-2, the second terminal sends the assistance data including the PRS configuration to the LMF.

In the operation S503a-3, the LMF sends the assistance data including the PRS configuration to the first terminal.

Through the operations of S503a-1, S503a-2 and S503a-3, the first terminal may acquire the PRS configuration for the second terminal.

Here, the assistance data request may correspond to the fifth request in the aforementioned embodiments, where the fifth request is used for requesting the sidelink signal configuration for the second terminal.

The operation S503b may include operations of S503b-1, S503b-2 and S503b-3.

In the operation S503b-1, the LMF sends to the first terminal the information for triggering the establishment of the sidelink (trigger establishment of sidelink).

In the operation S503b-2, the first terminal performs a sidelink establishment procedure.

In the operation S503b-3, the first terminal receives the assistance data including the PRS configuration from the second terminal through the sidelink.

The operation S503c may include operations of S503c-1, S503c-2 and S503c-3.

In the operation S503c-1, the LMF sends to the second terminal the information for triggering the establishment of the sidelink (trigger establishment of sidelink).

In the operation S503c-2, the second terminal performs a sidelink establishment procedure.

In the operation S503c-3, the first terminal receives the assistance data including the PRS configuration from the second terminal through the sidelink.

In case that the first terminal acquires the PRS configuration for the second terminal, the first terminal performs the operation S504.

In the operation S504, the first terminal measures the sidelink signal of the second terminal, to acquire a first measurement result.

After the operation S504, the first terminal may perform an operation of S505a or S505b.

The operation S505a includes operations of S505a-1 and S505a-2.

In the operation S505a-1, the first terminal determines first relative positioning information between the first terminal and the second terminal based on the first measurement result.

In the operation S505a-2, the first terminal sends the first relative positioning information to the LMF.

The operation S505b includes operations of S505b-1, S505b-2 and S505b-3.

In the operation S505b-1, the first terminal sends the first measurement result to the LMF.

In the operation S505b-2, the LMF determines the first relative positioning information between the first terminal and the second terminal based on the first measurement result.

In the operation S505b-3, the LMF sends the first relative positioning information to the first terminal.

In case that the LMF acquires the first relative positioning information, operations of S506a and S506b may be performed.

In the operation S506a, the LMF sends the first relative positioning information to the fourth terminal.

In the operation S506b, the LMF sends the first relative positioning information to the AMF.

Figure 6:
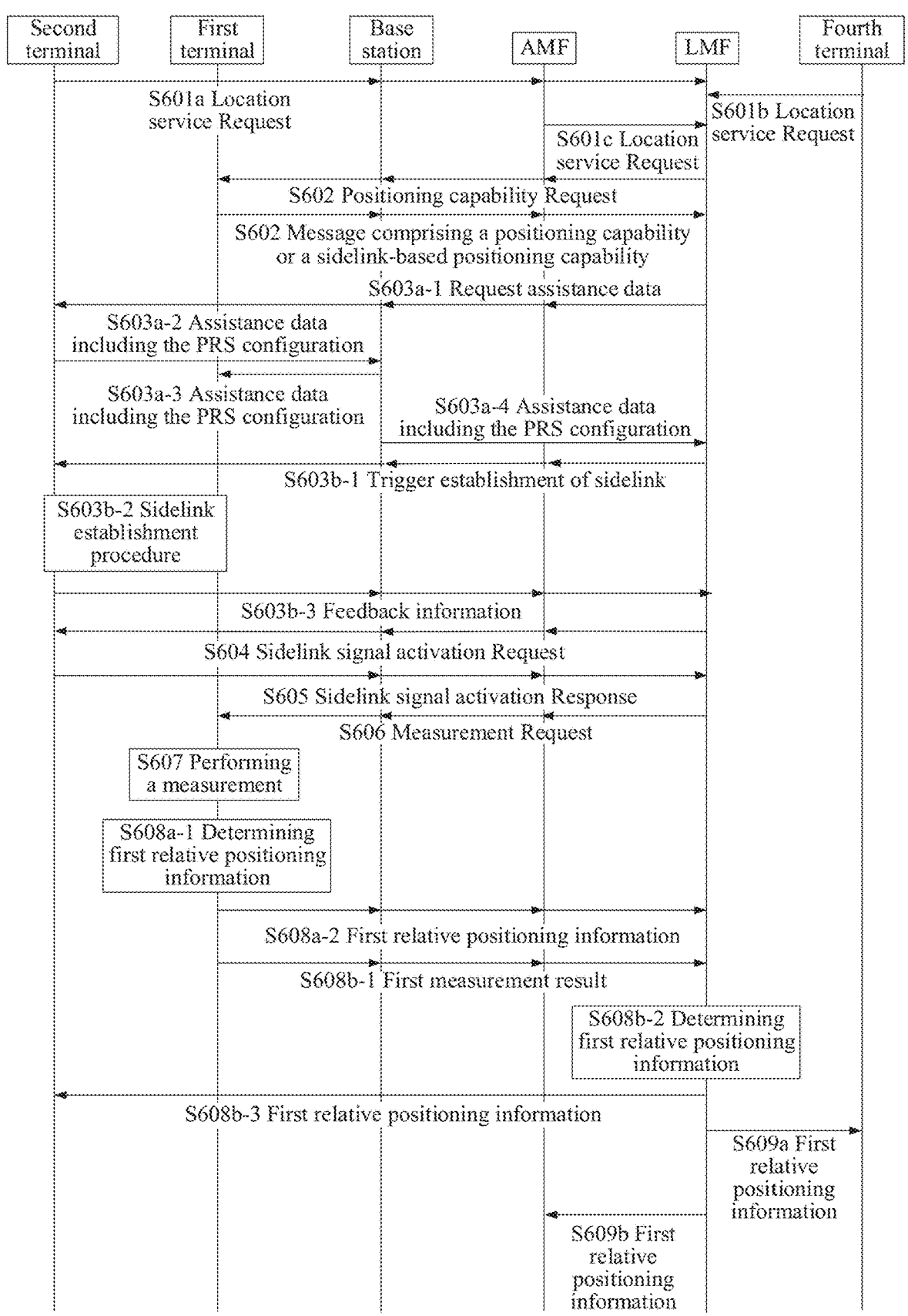
FIG. 6 is a flowchart of another method for location acquisition according to an embodiment of the present disclosure.

FIG. 6 is a flowchart of another method for location acquisition according to an embodiment of the present disclosure. As shown in FIG. 6, the method includes the following operations.

In the operation S601a, a second terminal sends a location service request to a LMF.

In the operation S601b, a fourth terminal sends the location service request to the LMF.

In the operation S601c, an AMF sends the location service request to the LMF.

Thereafter, as shown in the S602, a capability inquiry procedure for the first terminal is entered.

In the operation S602, the LMF sends a positioning capability request to a first terminal; and the first terminal sends a message comprising a positioning capability or a sidelink-based positioning capability to the LMF.

After the operation S602, one of the operations of S603a and S603b may be performed.

The operation S603a may include operations of S603a-1, S603a-2, S603a-3 and S603a-4.

In the operation S603a-1, the LMF sends a request (Request assistance data) for requesting an assistance data including a PRS configuration to the second terminal.

In the operation S603a-2, the second terminal sends the assistance data including the PRS configuration to a base station.

In the operation S603a-3, the base station sends the assistance data including the PRS configuration to the first terminal.

In the operation S603a-4, the base station sends the assistance data including the PRS configuration to the LMF.

The operation S603b may include operations of S603b-1, S603b-2 and S603b-3.

In the operation S603b-1, the LMF sends to the second terminal the information for triggering the establishment of the sidelink (trigger establishment of sidelink).

In the operation S603b-2, the second terminal performs a sidelink establishment procedure, and the first terminal receives the PRS configuration for the second terminal from the second terminal.

In the operation S603b-3, the second terminal sends feedback information to the LMF.

The feedback information may be a location information feedback (Positioning Information Response), which is used as the feedback (response for S-PRS configuration) for the PRS configuration.

The feedback information indicates that:

the establishment of the sidelink between the first terminal and the second terminal is completed; and/or the first terminal receives the sidelink signal configuration for the second terminal from the second terminal.

In the operation S604, the LMF sends a sidelink signal activation (PRS activation) request to the second terminal.

In the operation S605, the second terminal sends a sidelink signal activation response (PRS activation response) to the LMF.

In the operation S606, the LMF sends a measurement request to the first terminal.

In the operation S607, the first terminal measures the sidelink signal of the second terminal, to acquire the first measurement result.

After the S607, the first terminal may perform an operation of S608a or S608b.

The operation S608a includes operations of S608a-1 and S608a-2.

In the operation S608a-1, the first terminal determines the first relative positioning information between the first terminal and the second terminal based on the first measurement result.

In the operation S608a-2, the first terminal sends the first relative positioning information to the LMF.

The operation S608b includes operations of S608b-1, S608b-2 and S608b-3.

In the operation S608b-1, the first terminal sends the first measurement result to the LMF.

In the operation S608b-2, the LMF determines the first relative positioning information between the first terminal and the second terminal based on the first measurement result.

In the operation S608b-3, the LMF sends the first relative positioning information to the first terminal.

In case that the LMF acquires the first relative positioning information, operations of S609a and S609b may be performed.

In the operation S609a, the LMF sends the first relative positioning information to the fourth terminal.

In the S609b, the LMF sends the first relative positioning information to the AMF.

In the embodiments of the present disclosure, the communication between the first terminal or the second terminal and the LMF may be performed through the base station and the AMF. For example, the first terminal or the second terminal may send the information to the LMF through the base station and the AMF in turn. The LMF may send the information to the first terminal or the second terminal through the AMF and the base station in turn.

Preferred embodiments of the present disclosure have been described in detail with reference to the accompanying drawings, but the present disclosure is not limited to the specific details of the aforementioned embodiments. Within the scope of the technical conception of the present disclosure, various simple modifications can be made to the technical solution of the present disclosure, and such simple modifications all belong to the scope of protection of the present disclosure. For example, each of the specific technical features described in the aforementioned specific implementations may be combined in any suitable manner without contradiction, and various possible combinations are not further described in the present disclosure in order to avoid unnecessary repetition. For another example, any combination may be made between the various implementations of the present disclosure so long as it does not depart from the idea of the present disclosure, and is likewise to be regarded as the content of the present disclosure. For another example, on the premise of no conflict, various embodiments described in the present disclosure and/or the technical features in each of the embodiments can be combined with the prior art at will, and the technical solutions acquired after the combination should also fall within the scope of protection of the present disclosure.

It should also be noted that, in the various method embodiments of the present disclosure, the sequence of the serial number of the aforementioned processes does not mean the sequence of execution. The sequence of execution of the processes should be determined by their functions and inherent logic, and should not constitute any limitation on the implementation processes in the embodiments of the present disclosure. Further, in embodiments of the present disclosure, the terms "downlink", "uplink" and "sidelink" are used to represent a transmission direction of the signal or data. Here, "downlink" is used to represent that the transmission direction of the signal or data is a first direction transmitted from a station to a user equipment of a cell; "uplink" is used to represent that the transmission direction of the signal or data is a second direction transmitted from the user equipment of the cell to the station; and "sidelink" is used to represent that the transmission direction of the signal or data is a third direction transmitted from a user equipment 1 to a user equipment 2. For example, "downlink signal" is used to represent that the transmission direction of the signal is the first direction. Additionally, in the embodiments of the present disclosure, the term "and/or" only indicates an association relationship for describing associated objects and represents that there are three relationships. Specifically, A and/or B may represent three conditions: i.e., independent existence of A, existence of both A and B, and independent existence of B. In addition, the character "/" in the present disclosure usually represents that previous and next associated objects form an "or" relationship.

Figure 7:
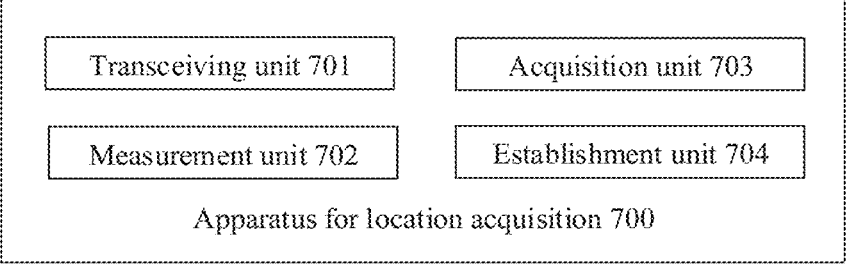
FIG. 7 is a first schematic structural diagram of an apparatus for location acquisition according to an embodiment of the present disclosure.

FIG. 7 is a first schematic structural diagram of an apparatus for location acquisition according to an embodiment of the present disclosure, which is applied to a first terminal. As shown in FIG. 7, the apparatus 700 for location acquisition includes: a transceiving unit 701, a measurement unit 702 and an acquisition unit 703. The transceiving unit 701 is configured to receive a sidelink signal configuration for a second terminal. The measurement unit 702 is configured to measure a sidelink signal of the second terminal based on the sidelink signal configuration for the second terminal, to acquire a first measurement result. The acquisition unit 703 is configured to acquire first relative positioning information between the first terminal and the second terminal, the first relative positioning information corresponding to the first measurement result.

In some embodiments, the transceiving unit 701 may be further configured to receive the sidelink signal configuration for the second terminal from the network device.

In some embodiments, the transceiving unit 701 may be further configured to receive the sidelink signal configuration for the second terminal from the second terminal through a sidelink between the first terminal and the second terminal.

In some embodiments, the transceiving unit 701 may be further configured to receive the first indication information from the network device, where the first indication information indicates the establishment of the sidelink between the first terminal and the second terminal. The apparatus 700 for location acquisition may further include an establishment unit 704, and the establishment unit 704 may be configured to establish the sidelink between the first terminal and the second terminal based on the first indication information.

In some embodiments, the transceiving unit 701 may be further configured to send feedback information to the network device. The feedback information indicates at least one of that: the establishment of the sidelink between the first terminal and the second terminal is completed; or, the first terminal receives the sidelink signal configuration for the second terminal from the second terminal.

In some embodiments, the acquisition unit 703 may be configured to determine the first relative positioning information based on the first measurement result.

In some embodiments, the transceiving unit 701 may be further configured to send the first relative positioning information to the network device and/or the second terminal.

In some embodiments, the transceiving unit 701 may be further configured to: send the first measurement result to the network device or the second terminal, and the first measurement result is used for the network device or the second terminal to determine the first relative positioning information between the first terminal and the second terminal; and receive the first relative positioning information from the network device or the second terminal.

In some embodiments, the transceiving unit 701 may be further configured to: receive a positioning capability request from the network device; and send a message comprising a positioning capability or a sidelink-based positioning capability to the network device.

In some embodiments, the measurement unit 702 may be further configured to measure the sidelink signal of the second terminal based on the sidelink signal configuration for the second terminal in response to receiving the measurement request from the network device.

In some embodiments, the transceiving unit 701 may be further configured to send a first request to the network device, where the first request indicates a relative positioning demand towards the second terminal.

In some embodiments, the first request may include or indicate at least one of the following: an identification of the second terminal, or an identification of a road side unit corresponding to the second terminal.

In some embodiments, the transceiving unit 701 may be further configured to: receive from the network device a second request for requesting the identification of the second terminal and/or the identification of the road side unit corresponding to the second terminal; and send to the network device the identification of the second terminal and/or the identification of the road side unit corresponding to the second terminal.

In some embodiments, the transceiving unit 701 may be further configured to receive the second relative positioning information between the second terminal and the third terminal from the second terminal or from the network device.

The acquisition unit 703 may be further configured to acquire the third relative positioning information between the first terminal and the third terminal. Here, the third relative positioning information is determined based on the first relative positioning information and the second relative positioning information information.

In some embodiments, the transceiving unit 701 may be further configured to receive the second measurement result or the third measurement result from the second terminal or the network device. Here, the second measurement result is acquired by the second terminal measuring a sidelink signal of the third terminal based on a sidelink signal configuration for the third terminal, the third measurement result is acquired by the third terminal measuring the sidelink signal of the second terminal based on the sidelink signal configuration for the second terminal. The acquisition unit 703 may be further configured to acquire the third relative positioning information between the first terminal and the third terminal. Here, the third relative positioning information is determined based on the first measurement result and the second measurement result, or the third relative positioning information is determined based on the first measurement result and the third measurement result.

In some embodiments, the acquisition unit 703 may be further configured to determine the third relative positioning information based on the first measurement result and the second measurement result or based on the first measurement result and the third measurement result.

In some embodiments, the transceiving unit 701 may be further configured to send to the network device or the second terminal one of the following: the first measurement result; the first measurement result and the second measurement result; or the first measurement result and the third measurement result. Here, the first measurement result and the second measurement result, or the first measurement result and the third measurement result, are used for the network device or the second terminal to determine the third relative positioning information. The transceiving unit 701 may be further configured to receive the third relative positioning information from the network device or the second terminal.

In some embodiments, the acquisition unit 703 may be further configured to determine the second terminal from multiple terminals based on multiple pieces of second indication information, where each of the multiple pieces of second indication information is sent by a respective one of the multiple terminals. Here, the second indication information indicates at least one of the following:

a third measurement result, the third measurement result being acquired by the second terminal measuring a reference signal of the third terminal;

a signal strength level of the reference signal of the third terminal, which is determined based on the third measurement result;

whether a data transmission exists between the second terminal and the third terminal; or, whether a communication connection is able to be established between the second terminal and the third terminal.

In some embodiments, the transceiving unit 701 may be further configured to send a third request to the network device, where the third request indicates each of the multiple terminals in an area corresponding to the network device to broadcast a respective one of the multiple pieces of the second indication information.

In some embodiments, the transceiving unit 701 may be further configured to receive multiple pieces of third indication information from the network device. The acquisition unit 703 may be further configured to determine the second terminal from the multiple terminals based on the multiple pieces of third indication information.

Here, each of the multiple pieces of third indication information is sent to the network device by a respective one of multiple terminals within an area corresponding to network device. Here, the third indication information indicates at least one of the following:

a fourth measurement result, the fourth measurement result being obtained by the second terminal measuring a reference signal of the third terminal and/or a reference signal of the first terminal;

a signal strength level of the reference signal of the third terminal and/or the reference signal of the first terminal, which are/is determined based on the fourth measurement result;

whether data transmission existing between the second terminal and the third terminal; and/or whether data transmission existing between the second terminal and the first terminal;

whether a communication connection being capable of being established between the second terminal and the third terminal; and/or whether a communication connection being capable of being established between the second terminal and the first terminal.

In some embodiments, the transceiving unit 701 may be further configured to send a fourth indication information to the second terminal. Alternatively, the first terminal may send fourth indication information to the second terminal through the network device. Here, the fourth indication information indicates: the second terminal to determine and send to the first terminal one of the second relative positioning information, the second measurement result, or the third measurement result; or the second terminal to determine and send, to the first terminal through the network device, one of the second relative positioning information, the second measurement result, or the third measurement result.

In some embodiments, the transceiving unit 701 may be further configured to send to the network device the fourth request for indicating a relative positioning demand towards the third terminal.

In some embodiments, at least one of the first relative positioning information, the second relative positioning information or the third relative positioning information includes a distance and/or an angle.

In some embodiments, the sidelink signal includes at least one of the following: a sidelink positioning reference signal, a sidelink demodulation reference signal (DMRS), a sidelink ranging reference signal (SR-RS), a sidelink sounding reference signal, or a sidelink channel state information (CSI) reference signal.

Figure 8:
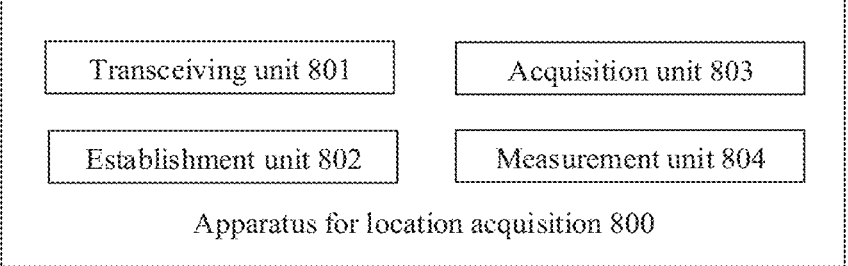
FIG. 8 is a second schematic structural diagram of an apparatus for location acquisition according to an embodiment of the present disclosure.

FIG. 8 is a second schematic structural diagram of an apparatus for location acquisition according to an embodiment of the present disclosure, which is applied to a second terminal. As shown in FIG. 8, the apparatus 800 for location acquisition includes a transceiving unit 801. The transceiving unit 801 is configured to send a sidelink signal configuration for the second terminal. Here, the sidelink signal configuration for the second terminal is used for a first terminal to measure a sidelink signal of the second terminal to acquire a first measurement result; and the sidelink signal configuration for the second terminal is further used for the first terminal or a network device to acquire first relative positioning information between the first terminal and the second terminal, the first relative positioning information corresponding to the first measurement result.

In some embodiments, the transceiving unit 801 may be further configured to: receive from the network device a fifth request for requesting the sidelink signal configuration for the second terminal; and send the sidelink signal configuration for the second terminal to the network device, where the sidelink signal configuration for the second terminal is used to be sent by the network device to the first terminal.

In some embodiments, the transceiving unit 801 may be further configured to send the sidelink signal configuration for the second terminal to the first terminal through a sidelink between the second terminal and the first terminal.

In some embodiments, the transceiving unit 801 may be further configured to receive fifth indication information from the network device, where the fifth indication information indicates the establishment of the sidelink between the second terminal and the first terminal. The apparatus 800 for location acquisition may further include: an establishment unit 802, configured to establish the sidelink between the second terminal and the first terminal based on the fifth indication information.

In some embodiments, the transceiving unit 801 may be further configured to: receive the first measurement result from the first terminal through the sidelink between the second terminal and the first terminal; and send the first relative positioning information to the first terminal through the sidelink between the second terminal and the first terminal.

In some embodiments, the transceiving unit 801 may be further configured to receive the first measurement result from the network device, and the first measurement result is sent by the first terminal to the network device. The apparatus 800 for location acquisition may further include: an acquisition unit 803, configured to determine the first relative positioning information based on the first measurement result. The transceiving unit 801 may be further configured to send the first relative positioning information to the network device, and the first relative positioning information is used to be sent by the network device to the first terminal.

In some embodiments, the transceiving unit 801 may be further configured to: receive an activation request for the sidelink signal from the network device; in response to the activation request for the sidelink signal, broadcast the sidelink signal or unicast the sidelink signal to the first terminal; and send an activation response for the sidelink signal to the network device.

In some embodiments, the transceiving unit 801 may be further configured to: send to the network device a sixth request for indicating a relative positioning demand towards the first terminal; and receive the first relative positioning information between the first terminal and the second terminal from the network device.

In some embodiments, the sixth request may include or indicate at least one of the following: an identification of the first terminal, or an identification of a road side unit corresponding to the first terminal.

In some embodiments, the transceiving unit 801 may be further configured to: receive from the network device a seventh request for requesting an identification of the first terminal and/or an identification of a road side unit corresponding to the first terminal; and send to the network device the identification of the first terminal and/or the identification of the road side unit corresponding to the first terminal.

In some embodiments, the transceiving unit 801 may be further configured to receive the sidelink signal configuration for the third terminal. The apparatus 800 for location acquisition may further include: a measurement unit 804, configured to measure the sidelink signal of the third terminal based on the sidelink signal configuration for the third terminal, to acquire a second measurement result.

The acquisition unit 803 may be further configured to acquire the second relative positioning information between the second terminal and the third terminal based on the second measurement result.

The transceiving unit 801 may be further configured to: send the second relative positioning information to the first terminal or the network device. Here, the second relative positioning information is used to be sent by the network device to the first terminal, or is used for the network device to determine the third relative positioning information.

In some embodiments, the transceiving unit 801 may be further configured to receive the sidelink signal configuration for the third terminal. The measurement unit 804 may be configured to measure the sidelink signal of the third terminal based on the sidelink signal configuration for the third terminal, to acquire the second measurement result. The transceiving unit 801 may be further configured to: send the second measurement result to the first terminal or the network device, and the second measurement result is used to be sent by the network device to the first terminal.

In some embodiments, the transceiving unit 801 may be further configured to: send the sidelink signal configuration for the second terminal to a third terminal, or to the third terminal through the network device, and the sidelink signal configuration for the second terminal is used for the third terminal to measure the sidelink signal of the second terminal and determine a third measurement result or second relative positioning information; receive the third measurement result or the second relative positioning information from the third terminal, or from the third terminal through the network device; and send the third measurement result or the second relative positioning information to the first terminal, or to the first terminal through the network device.

In some embodiments, the transceiving unit 801 may be further configured to receive fourth indication information from the first terminal. Here, the fourth indication information indicates: the second terminal to determine and send to the first terminal one of the second relative positioning information, the second measurement result, or the third measurement result; or the second terminal to determine and send, to the first terminal through the network device, one of the second relative positioning information, the second measurement result, or the third measurement result.

In some embodiments, the transceiving unit 801 may be further configured to receive from the first terminal or the network device, one of the following: the first measurement result; the first measurement result and a second measurement result; or the first measurement result and a third measurement result. Here, the second measurement result is acquired by the second terminal measuring a sidelink signal of a third terminal based on a sidelink signal configuration for the third terminal, the third measurement result is acquired by the third terminal measuring the sidelink signal of the second terminal based on the sidelink signal configuration for the second terminal. The acquisition unit 803 may be further configured to determine the third relative positioning information between the first terminal and the third terminal based on the first measurement result and the second measurement result or based on the first measurement result and the third measurement result. The transceiving unit 801 may be further configured to: send the third relative positioning information to the first terminal, or send the third relative positioning information to the first terminal through the network device.

In some embodiments, the transceiving unit 801 may be further configured to receive from the first terminal or the network device the first relative positioning information and the second relative positioning information between the second terminal and the third terminal. The acquisition unit 803 may be further configured to determine the third relative positioning information between the first terminal and the third terminal based on the first relative positioning information and the second relative positioning information. The transceiving unit 801 may be further configured to: send the third relative positioning information to the first terminal, or send the third relative positioning information to the first terminal through the network device.

In some embodiments, at least one of the first relative positioning information or the second relative positioning information includes a distance and/or an angle.

In some embodiments, the sidelink signal includes at least one of the following: a sidelink positioning reference signal, a sidelink demodulation reference signal (DMRS), a sidelink ranging reference signal (SR-RS), a sidelink sounding reference signal, or a sidelink channel state information (CSI) reference signal.

Figure 9:
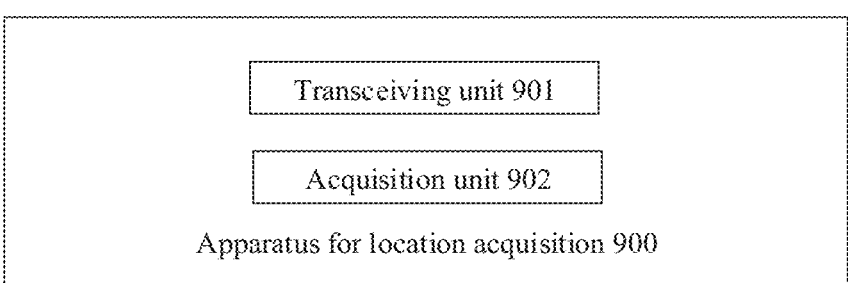
FIG. 9 is a third schematic structural diagram of an apparatus for location acquisition according to an embodiment of the present disclosure.

FIG. 9 is a third schematic structural diagram of an apparatus for location acquisition according to an embodiment of the present disclosure, which is applied to a network device. As shown in FIG. 9, the apparatus 900 for location acquisition includes: a transceiving unit 901, configured to indicate a second terminal to send a sidelink signal configuration for the second terminal. Here, the sidelink signal configuration for the second terminal is used for a first terminal to measure a sidelink signal of the second terminal to acquire a first measurement result. The sidelink signal configuration for the second terminal is further used for the first terminal or the network device to acquire first relative positioning information between the first terminal and the second terminal, the first relative positioning information corresponding to the first measurement result.

In some embodiments, the transceiving unit 901 may be further configured to: send to the second terminal the fifth request for requesting the sidelink signal configuration for the second terminal; receive the sidelink signal configuration for the second terminal from the second terminal; and send the sidelink signal configuration for the second terminal to the first terminal.

In some embodiments, the transceiving unit 901 may be further configured to: send first indication information to the first terminal, or, send fifth indication information to the second terminal. Here, the first indication information or the fifth indication information indicates an establishment of a sidelink between the first terminal and the second terminal. The transceiving unit 901 may be further configured to indicate the second terminal to send the sidelink signal configuration for the second terminal to the first terminal through the sidelink between the first terminal and the second terminal.

In some embodiments, the transceiving unit 901 may be further configured to receive feedback information from the first terminal or the second terminal. The feedback information indicates at least one of that: the establishment of the sidelink between the first terminal and the second terminal is completed; or, the first terminal receives the sidelink signal configuration for the second terminal from the second terminal.

In some embodiments, the transceiving unit 901 may be further configured to receive the first relative positioning information from the first terminal.

In some embodiments, the transceiving unit 901 may be further configured to receive the first measurement result from the first terminal. The apparatus 900 for location acquisition may further include: an acquisition unit 902, configured to determine the first relative positioning information based on the first measurement result. The transceiving unit 901 may be further configured to send the first relative positioning information to the first terminal.

In some embodiments, the transceiving unit 901 may be further configured to: receive the first measurement result from the first terminal, and send the first measurement result to the second terminal. Here, the first measurement result is used for the second terminal to determine the first relative positioning information. The transceiving unit 901 may be further configured to: receive the first relative positioning information from the second terminal, and send the first relative positioning information to the first terminal.

In some embodiments, the transceiving unit 901 may be further configured to: receive from AMF and/or a fourth terminal a sixth request for requesting the first relative positioning information; and send the first relative positioning information to the AMF and/or the fourth terminal.

In some embodiments, the transceiving unit 901 may be further configured to: send a positioning capability request to the first terminal; and receive the message comprising the positioning capability or the sidelink-based positioning capability from the first terminal.

In some embodiments, the transceiving unit 901 may be further configured to: send the activation request for the sidelink signal to the second terminal; and receive the activation response for the sidelink signal from the second terminal.

In some embodiments, the transceiving unit 901 may be further configured to send a measurement request to the first terminal, where the measurement request indicates the first terminal to measure the sidelink signal of the second terminal.

In some embodiments, the transceiving unit 901 may be further configured to receive from the first terminal a first request for indicating a relative positioning demand towards the second terminal.

In some embodiments, the first request may include or indicate: an identification of the second terminal, and/or an identification of a road side unit corresponding to the second terminal.

In some embodiments, the transceiving unit 901 may be further configured to: send to the first terminal a second request for requesting the identification of the second terminal and/or the identification of the road side unit corresponding to the second terminal; and receive from the first terminal the identification of the second terminal and/or the identification of the road side unit corresponding to the second terminal.

In some embodiments, the transceiving unit 901 may be further configured to: receive from the second terminal a sixth request for indicating a relative positioning demand towards the first terminal; and send the first relative positioning information to the second terminal.

In some embodiments, the sixth request may include or indicate: an identification of the first terminal, and/or an identification of a road side unit corresponding to the first terminal.

In some embodiments, the transceiving unit 901 may be further configured to: send to the second terminal a seventh request for requesting an identification of the first terminal and/or an identification of a road side unit corresponding to the first terminal; and receive from the second terminal the identification of the first terminal and/or the identification of the road side unit corresponding to the first terminal.

In some embodiments, the transceiving unit 901 may be further configured to: receive the second relative positioning information between the second terminal and the third terminal from the second terminal or the third terminal; and send the second relative positioning information to the first terminal.

In some embodiments, the transceiving unit 901 may be further configured to: receive the second measurement result from the second terminal or the third measurement result from the third terminal, the second measurement result is acquired by the second terminal measuring a sidelink signal of the third terminal based on a sidelink signal configuration for the third terminal, the third measurement result is acquired by the third terminal measuring the sidelink signal of the second terminal based on the sidelink signal configuration for the second terminal; and send the second measurement result or the third measurement result to the first terminal.

In some embodiments, the transceiving unit 901 may be further configured to receive from the first terminal one of: the first measurement result; the first measurement result and the second measurement result; or, the first measurement result and the third measurement result.

The acquisition unit 902 may be configured to determine the third relative positioning information between the first terminal and the third terminal based on the first measurement result and the second measurement result or based on the first measurement result and the third measurement result.

The transceiving unit 901 may be further configured to send the third relative positioning information to the first terminal.

In some embodiments, the transceiving unit 901 may be further configured to: receive the second relative positioning information between the second terminal and the third terminal from the second terminal or the third terminal; and send to the first terminal the second relative positioning information, or the first relative positioning information and the second relative positioning information which are used for the first terminal to determine third relative positioning information between the first terminal and the third terminal. The acquisition unit 902 may be configured to determine the third relative positioning information between the first terminal and the third terminal based on the first relative positioning information and the second relative positioning information. The transceiving unit 901 may be further configured to send the third relative positioning information to the first terminal.

In some embodiments, the transceiving unit 901 may be further configured to: receive from the first terminal a third request for indicating each of the multiple terminals within an area corresponding to the network device to broadcast a respective one of the multiple pieces of second indication information; and send to each of the multiple terminals sixth indication information for indicating to broadcast the second indication information. Here, the second indication information indicates at least one of the following:

a third measurement result, the third measurement result being acquired by the second terminal measuring a reference signal of the third terminal;

a signal strength level of the reference signal of the third terminal, which is determined based on the third measurement result;

whether a data transmission exists between the second terminal and the third terminal; or, whether a communication connection is able to be established between the second terminal and the third terminal.

In some embodiments, the transceiving unit 901 may be further configured to: receive the multiple pieces of third indication information, where each of the multiple pieces of third indication information is sent by a respective one of multiple terminals within an area corresponding to the network device; send the multiple pieces of the third indication information to the first terminal, or determine the second terminal from the multiple terminals based on the multiple pieces of third indication information; and send an identification of the second terminal to the first terminal. The third indication information indicates at least one of the following:

a fourth measurement result, the fourth measurement result being obtained by the second terminal measuring a reference signal of the third terminal and/or a reference signal of the first terminal;

a signal strength level of the reference signal of the third terminal and/or a signal strength level of the reference signal of the first terminal, which are/is determined based on the fourth measurement result;

whether data transmission existing between the second terminal and the third terminal; and/or whether data transmission existing between the second terminal and the first terminal; or whether a communication connection being capable of being established between the second terminal and the third terminal; and/or whether a communication connection being capable of being established between the second terminal and the first terminal.

In some embodiments, the transceiving unit 901 may be further configured to receive from the first terminal a fourth request for indicating a relative positioning demand towards the third terminal.

In some embodiments, at least one of the first relative positioning information or the second relative positioning information includes a distance and/or an angle.

In some embodiments, the sidelink signal includes at least one of the following: a sidelink positioning reference signal, a sidelink demodulation reference signal (DMRS), a sidelink ranging reference signal (SR-RS), a sidelink sounding reference signal, or a sidelink channel state information (CSI) reference signal.

Those skilled in the art should understand that, the relevant description of the aforementioned apparatus for location acquisition according to the embodiments of the present disclosure may be understood with reference to the relevant description of the method for location acquisition according to the embodiments of the present disclosure.

Figure 10:
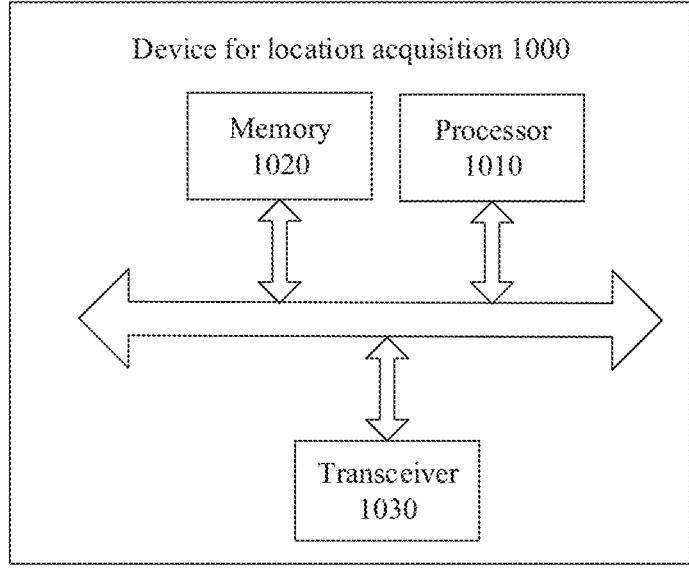
FIG. 10 is a schematic structural diagram of a device for location acquisition according to an embodiment of the present disclosure.

FIG. 10 is a schematic structural diagram of a device for location acquisition according to an embodiment of the present disclosure. The device for location acquisition may be a first terminal, a second terminal or a network device. The device 1000 for location acquisition shown in FIG. 10 includes a processor 1010 and a memory 1020. The memory 1020 is configured to store a computer program that can be run on the processor 1010. When executing the computer program, the processor 1010 is configured to implement the methods in the embodiments of the present disclosure. That is, the processor 1010 may call and run the computer program from the memory, to implement the methods in the embodiments of the present disclosure.

In an embodiment, as shown in FIG. 10, the device 1000 for location acquisition may further include the memory 1020. Here, the processor 1010 may call and run the computer program from the memory 1020 to implement the methods in the embodiments of the present disclosure.

Here, the memory 1020 may be a separate device independent of the processor 1010 or may be integrated in the processor 1010.

In an embodiment, as shown in FIG. 10, the device 1000 for location acquisition may further include a transceiver 1030, and the processor 1010 may control the transceiver 1030 to communicate with other devices. Specifically, the transceiver 1030 may transmit information or data to other devices, or receive information or data from other devices.

Here, the transceiver 1030 may include a transmitter and a receiver. The transceiver 1030 may further include one or more antennas. In some embodiments, the device 1000 for location acquisition may be the network device in the embodiments of the present disclosure. The device 1000 for location acquisition may implement the corresponding process implemented by the network device in each of the methods in the embodiments of the present disclosure. For brevity, details will not be repeated herein again. In some embodiments, the device 1000 for location acquisition may be the first terminal or the second terminal in the embodiments of the present disclosure. The device 1000 for location acquisition may implement the corresponding process implemented by the first terminal or the second terminal in each of the methods in the embodiments of the present disclosure. For brevity, details will not be repeated herein again.

Figure 11:
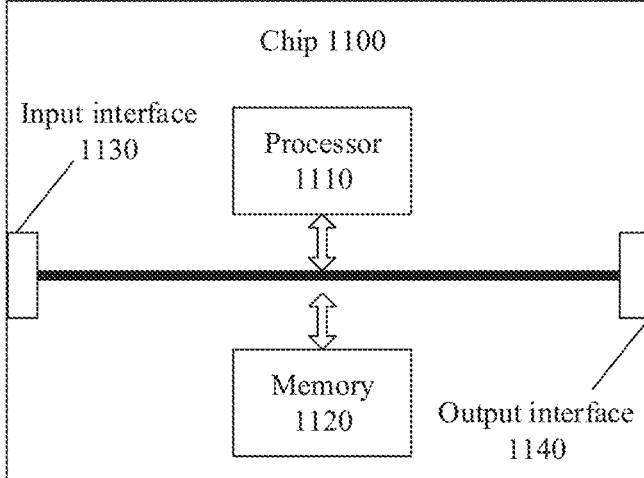
FIG. 11 is a schematic structural diagram of a chip according to an embodiment of the present disclosure.

FIG. 11 is a schematic structural diagram of a chip according to an embodiment of the present disclosure. The chip 1100 shown in FIG. 11 includes a processor 1110. The processor 1110 is configured to call and run a computer program in a memory 1120 to enable a device installed with the chip 1100 to execute the methods in the embodiments of the present disclosure. That is, the processor 1110 may call and run the computer program from the memory to implement the methods in the embodiments of the present disclosure. In an embodiment, as shown in FIG. 11, the chip 1100 may further include the memory 1120. Here, the processor 1110 may call and run the computer program from the memory 1120 to implement the methods in the embodiments of the present disclosure. Here, the memory 1120 may be a separate device independent of the processor 1110 or may be integrated in the processor 1110. In some embodiments, the chip 1100 may further include an input interface 1130. Here, the processor 1110 may control the input interface 1130 to communicate with other devices or chips. Specifically, the input interface 1130 may obtain information or data from other devices and chips. In some embodiment, the chip 1100 may further include an output interface 1140. Here, the processor 1110 may control the output interface 1140 to communicate with other devices or chips. Specifically, the output interface 1140 may output information or data to other devices and chips. In some embodiments, the chip may be applied to the network device in the embodiments of the present disclosure, and the chip may implement the corresponding process implemented by the network device in each of the methods in the embodiments of the present disclosure. For brevity, details will not be repeated herein again. In some embodiment, the chip may be applied in the first terminal or the second terminal in the embodiments of the present disclosure. The chip may implement the corresponding process implemented by the first terminal or the second terminal in each of the methods in the embodiments of the present disclosure. For brevity, details will not be repeated herein again.

It should be understood that the chip mentioned in the embodiments of the present disclosure may also be referred as a system-level chip, a system chip, a chip system, or a system-on chip, etc.

Embodiments of the present disclosure further provide a computer-readable storage medium, which has stored thereon one or more programs. The one or more programs, when executed by one or more processors, implement the methods in the embodiments of the present disclosure.

In some embodiments, the computer-readable storage medium may be applied to the network device in the embodiments of the present disclosure, and the computer programs may be executed to cause the computer to perform processes implemented by the network device in each of the methods in the embodiments of the present disclosure. For brevity, details will not be repeated herein again.

In some embodiments, the computer-readable storage medium may be applied in the first terminal or the second terminal in the embodiments of the present disclosure. The computer programs may enable a computer to implement the corresponding process implemented by the first terminal or the second terminal in each of the methods in the embodiments of the present disclosure. For brevity, details will not be repeated herein again.

Embodiments of the present disclosure further provide a computer program product, which includes a computer storage medium. The computer storage medium stores computer program, the computer program includes instructions executed by at least one processor, and the at least one processor executes the instructions to implement the methods in the embodiments of the present disclosure.

In some embodiments, the computer program product may be applied to the network device in the embodiments of the present disclosure, and the computer program instructions are executed to cause the computer to perform the processes implemented by the network device in each of the methods in the embodiment of the present disclosure. For brevity, details will not be repeated herein again. In some embodiments, the computer program product may be applied in the first terminal or the second terminal in the embodiments of the present disclosure. The computer program instruction may enable a computer to implement the corresponding process implemented by the first terminal or the second terminal in each of the methods in the embodiments of the present disclosure. For brevity, details will not be repeated herein again.

Embodiments of the present disclosure further provide a computer program, where the computer program enables a computer to execute each of the methods in the embodiments of the present disclosure. In some embodiments, the computer program may be applied to the network device in the embodiments of the present disclosure, and when the computer program is run on a computer, the computer performs the processes implemented by the network device in each method of the embodiment of the present disclosure. For brevity, details will not be repeated herein again.

In some embodiments, the computer program may be applied in the first terminal or the second terminal in the embodiments of the present disclosure. When the computer program running on the computer, the computer implements the corresponding process implemented by the first terminal or the second terminal in each of the methods in the embodiments of the present disclosure. For brevity, details will not be repeated herein again.

It is to be understood that the processor in the embodiments of the present disclosure may be an integrated circuit chip and has a signal processing capability. In an implementation process, each step of the method embodiment may be completed by an integrated logical circuit of hardware or an instruction in a software form in the processor. The aforementioned processor may include an integration of any one or more of the following: a universal processor, an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a Graphics Processing Unit (GPU), an embedded neural-network processing unit (NPU), a controller, a microcontroller, a microprocessor, a programmable logic device, a discrete gate, a transistor logic device, or a discrete hardware component. Each method, step and logical block diagram disclosed in the embodiments of the present disclosure may be implemented or executed. The universal processor may be a microprocessor or the processor may also be any common processor and the like. The operations of the method disclosed in combination with the embodiments of the present disclosure may be directly embodied to be executed and implemented by a hardware decoding processor or executed and implemented by a combination of hardware and software modules in the decoding processor. The software module may be located in a mature storage medium in this field such as a random access memory, a flash memory, a read-only memory, a programmable read-only memory or electrically erasable programmable read-only memory and a register. The storage medium is located in a memory, and the processor reads information in the memory, and implements the steps of the methods in combination with hardware.

It can be understood that the memory or the computer storage medium in the embodiments of the present disclosure may be a volatile memory or a nonvolatile memory, or may include both the volatile and nonvolatile memories. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM), which is used as an external cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the present disclosure is intended to include, but not limited to, memories of these and any other proper types.

It can be understood that the above memory or the computer storage medium is described only exemplarily rather than limitedly. For example, the memory in the embodiments of the present disclosure may be a SRAM, a DRAM, a SDRAM, a DDR SDRAM, an ESDRAM, a SLDRAM, a DR RAM and the like. That is, the memory in the embodiments of the present disclosure is intended to include, but not limited to, memories of these and any other proper types.

Those of ordinary skill in the art may realize that the units and algorithm steps of each example described in combination with the embodiments disclosed in the present disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly know about that the specific working process of the system, device and unit described above may be made to the corresponding processes in the above mentioned method embodiments, and the specific working process of the system, device and unit will not be elaborated herein for convenient and brief description.

In some embodiments of the present disclosure, it should be noted that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection through some interfaces, the device or the units, and may be electrical and mechanical or adopt other forms.

The units described as separate parts may or may not be physically separated, and parts displayed as units may or may not be physical units, that is, may be located in the same place, or may also be distributed to multiple network units. A part or all of the units may be selected to achieve the purpose of the solutions of the embodiments according to a practical requirement.

In addition, functional units in each embodiment of the present disclosure may be integrated into a processing unit, each functional unit may also physically exist independently, and two or more than two functional units may also be integrated into a unit.

If the above functions are implemented in the form of a software function module and sold or used as an independent product, it can be stored in a computer-readable storage medium. Based on such understanding, the technical solutions of the embodiments of the present disclosure in essence or part of making contribution to the related art, or a part of the technical solutions can be implemented in the form of a software product. The computer software product is stored in a storage medium and includes several instructions to enable the computer device (which may be a personal computer, a server or a network device, etc.) to execute all or a part of the methods described in the various embodiments of the present disclosure. The forgoing storage media includes various mediums that can store program codes, such as a USB disk, a mobile hard disk, an ROM, an RAM, a magnetic disk, or an optical disk, and the like.

The foregoing is only the specific implementations of the present disclosure, but the protection scope of the present disclosure is not limited thereto. Variation and substitution which can be readily thought by those skilled in the art within the technical scope disclosed in the present disclosure should fall within the protection scope of the present disclosure. Therefore, the protection scope of this disclosure should be subject to the protection scope of the claims.

The invention claimed is:

1. A method for location acquisition, comprising:
  receiving, by a first terminal, a sidelink signal configuration for a second terminal;
  measuring, by the first terminal, a sidelink signal of the second terminal based on the sidelink signal configuration for the second terminal, to acquire a first measurement result; and
  acquiring, by the first terminal, first relative positioning information between the first terminal and the second terminal, the first relative positioning information corresponding to the first measurement result,
  wherein acquiring, by the first terminal, the first relative positioning information between the first terminal and the second terminal, the first relative positioning information corresponding to the first measurement result, comprises:
  sending, by the first terminal, the first measurement result to the second terminal, the first measurement result being used for the second terminal to determine the first relative positioning information between the first terminal and the second terminal; and
  receiving, by the first terminal, the first relative positioning information from the second terminal.

2. The method of claim 1, wherein receiving, by the first terminal, the sidelink signal configuration for the second terminal, comprises:

receiving, by the first terminal, the sidelink signal configuration for the second terminal from a network device.

3. The method of claim 1, wherein receiving, by the first terminal, the sidelink signal configuration for the second terminal, comprises:

receiving, by the first terminal, the sidelink signal configuration for the second terminal from the second terminal through a sidelink between the first terminal and the second terminal.

4. The method of claim 1, further comprising:

receiving, by the first terminal, a positioning capability request from the network device; and sending, by the first terminal, a message comprising a positioning capability or a sidelink-based positioning capability to the network device.

5. The method of claim 1, wherein measuring, by the first terminal, the sidelink signal of the second terminal based on the sidelink signal configuration for the second terminal, comprises:

in case that the first terminal receives a measurement request from a network device, measuring, by the first terminal, the sidelink signal of the second terminal based on the sidelink signal configuration for the second terminal.

6. The method of claim 1, further comprising:

sending, by the first terminal, a first request to a network device, the first request indicating a relative positioning demand towards the second terminal.

7. The method of claim 6, wherein the first request comprises or indicates at least one of: an identification of the second terminal, or an identification of a road side unit corresponding to the second terminal.

8. The method of claim 1, further comprising:

determining, by the first terminal, whether a quality of a detected reference signal from a terminal is higher than a threshold, and determining a terminal corresponding to the quality of the reference signal greater than the threshold as the second terminal.

9. The method of claim 1, further comprising:

receiving, by the first terminal, a sidelink signal broadcasted by the second terminal based on the sidelink signal configuration for the second terminal; and determining, by the first terminal, the first measurement result based on a signal quality and/or a signal strength of the sidelink signal received from the second terminal.

10. An apparatus for location acquisition, comprising:

a transceiver, configured to receive a sidelink signal configuration for a second terminal;

a processor, configured to:

measure a sidelink signal of the second terminal based on the sidelink signal configuration for the second terminal, to acquire a first measurement result; and acquire first relative positioning information between the first terminal and the second terminal, the first relative positioning information corresponding to the first measurement result, wherein the transceiver is specifically configured to:

send the first measurement result to the second terminal, the first measurement result being used for the second terminal to determine the first relative positioning information between the first terminal and the second terminal; and receive the first relative positioning information from the second terminal.

11. The apparatus of claim 10, wherein the processor is further configured to:

determine whether a quality of a detected reference signal from a terminal is higher than a threshold, and determine a terminal corresponding to the quality of the reference signal greater than the threshold as the second terminal.

12. The apparatus of claim 10, wherein the transceiver is further configured to:

receive a sidelink signal broadcasted by the second terminal based on the sidelink signal configuration for the second terminal; and the processor is further configured to:

determine the first measurement result based on a signal quality and/or a signal strength of the sidelink signal received from the second terminal.

13. An apparatus for location acquisition, comprising: a transceiver, configured to indicate a second terminal to send a sidelink signal configuration for the second terminal; wherein the sidelink signal configuration for the second terminal is used for a first terminal to measure a sidelink signal of the second terminal to acquire a first measurement result; and the sidelink signal configuration for the second terminal is further used for the first terminal or the network device to acquire first relative positioning information between the first terminal and the second terminal, the first relative positioning information corresponding to the first measurement result, wherein the first measurement result is sent from the first terminal to the second terminal, the first measurement result is used for the second terminal to determine the first relative positioning information between the first terminal and the second terminal, and the first relative positioning information is received by the first terminal from the second terminal.

14. The apparatus of claim 13, wherein the transceiver is further configured to:

send a fifth request to the second terminal, the fifth request requesting the sidelink signal configuration for the second terminal;

receive the sidelink signal configuration for the second terminal from the second terminal; and send the sidelink signal configuration for the second terminal to the first terminal.

15. The apparatus of claim 13, wherein the transceiver is further configured to:

send a positioning capability request to the first terminal; and receive a message comprising a positioning capability or a sidelink-based positioning capability from the first terminal.

16. The apparatus of claim 13, wherein the transceiver is further configured to:

send a measurement request to the first terminal, the measurement request indicating the first terminal to measure the sidelink signal of the second terminal based on.

17. The apparatus of claim 13, wherein the transceiver is further configured to:

receive a first request from the first terminal, the first request indicating a relative positioning demand towards the second terminal.

18. The apparatus of claim 17, wherein the first request comprises or indicates at least one of an identification of the second terminal, or an identification of a road side unit corresponding to the second terminal.

19. The apparatus of claim 13, wherein the transceiver is further configured to:

send first indication information to the first terminal, or, send fifth indication information to the second terminal; the first indication information or the fifth indication information indicating an establishment of an sidelink between the first terminal and the second terminal, and indicate the second terminal to send the sidelink signal configuration for the second terminal to the first terminal through the sidelink between the first terminal and the second terminal.

20. The apparatus of claim 19, wherein the transceiver is further configured to:

receive feedback information from the first terminal or the second terminal, the feedback information indicating at least one of that:

the establishment of the sidelink between the first terminal and the second terminal is completed; or, the first terminal receives the sidelink signal configuration for the second terminal from the second terminal.

\* \* \* \* \*